United States Patent
Fujita et al.

(12) 
(10) Patent No.: US 6,658,374 B2
(45) Date of Patent: Dec. 2, 2003

(54) MAINTENANCE SUPPORT SYSTEM FOR ELECTRONIC APPARATUS

(75) Inventors: Shinichi Fujita, Kanagawa (JP); Norimasa Ozaki, Kanagawa (JP); Takeo Ugai, Kanagawa (JP); Takafumi Ito, Kanagawa (JP); Sensaburo Nakamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 271 days.

(21) Appl. No.: 09/835,901

(22) Filed: Apr. 16, 2001

(65) Prior Publication Data

US 2002/0007255 A1 Jan. 17, 2002

(30) Foreign Application Priority Data

Apr. 17, 2000 (JP) ......................................... 2000-115506

(51) Int. Cl.[7] ............................ G06F 19/00; G06F 17/00
(52) U.S. Cl. ................................. 702/188; 340/870.16
(58) Field of Search ................................. 702/188, 182, 702/183, 184, 185, 187; 340/870.01, 870.16, 500

(56) References Cited

U.S. PATENT DOCUMENTS

| | | | | |
|---|---|---|---|---|
| 5,583,796 A | * | 12/1996 | Reese | .......................... 702/185 |
| 5,594,900 A | * | 1/1997 | Cohn et al. | ................... 707/202 |
| 6,108,492 A | * | 8/2000 | Miyachi | ..................... 358/1.15 |
| 6,317,787 B1 | * | 11/2001 | Boyd et al. | ................... 709/224 |
| 6,477,483 B1 | * | 11/2002 | Scarlat et al. | ................ 702/186 |
| 6,496,949 B1 | * | 12/2002 | Kanevsky et al. | ............. 714/47 |
| 2001/0007138 A1 | * | 7/2001 | Iida et al. | ....................... 714/25 |
| 2001/0044910 A1 | * | 11/2001 | Ricart et al. | ..................... 714/6 |
| 2002/0016827 A1 | * | 2/2002 | McCabe et al. | ............. 709/213 |
| 2003/0028829 A1 | * | 2/2003 | Slater et al. | .................. 714/47 |
| 2003/0036882 A1 | * | 2/2003 | Harper et al. | ................ 702/186 |

FOREIGN PATENT DOCUMENTS

JP 11-205346 7/1999 ........... H04L/12/28

* cited by examiner

*Primary Examiner*—Patrick Assouad
(74) *Attorney, Agent, or Firm*—Frommer Lawrence & Haug LLP; William S. Frommer; Hans R. Mahr

(57) ABSTRACT

A maintenance support system for an electronic apparatus, having an electronic processing system including an electronic apparatus and a remote management system connected to each electronic processing system. Each electronic processing system includes a system for transmitting information of the connection of the electronic apparatus, transmitting information concerning setting of the electronic apparatus, and transmitting information notifying occurrence of a problem of the electronic apparatus to the remote management system. The remote management system includes a system for reporting the notification in the remote management system when receiving the notification, a system for configuring a reproduction electronic apparatus having substantially the same connection, setting the connection and setting of the electronic apparatus in the remote management system, and a system for reproducing on the reproduction electronic apparatus the state when the problem occurred by executing the same operation as the operation of the electronic apparatus.

12 Claims, 17 Drawing Sheets

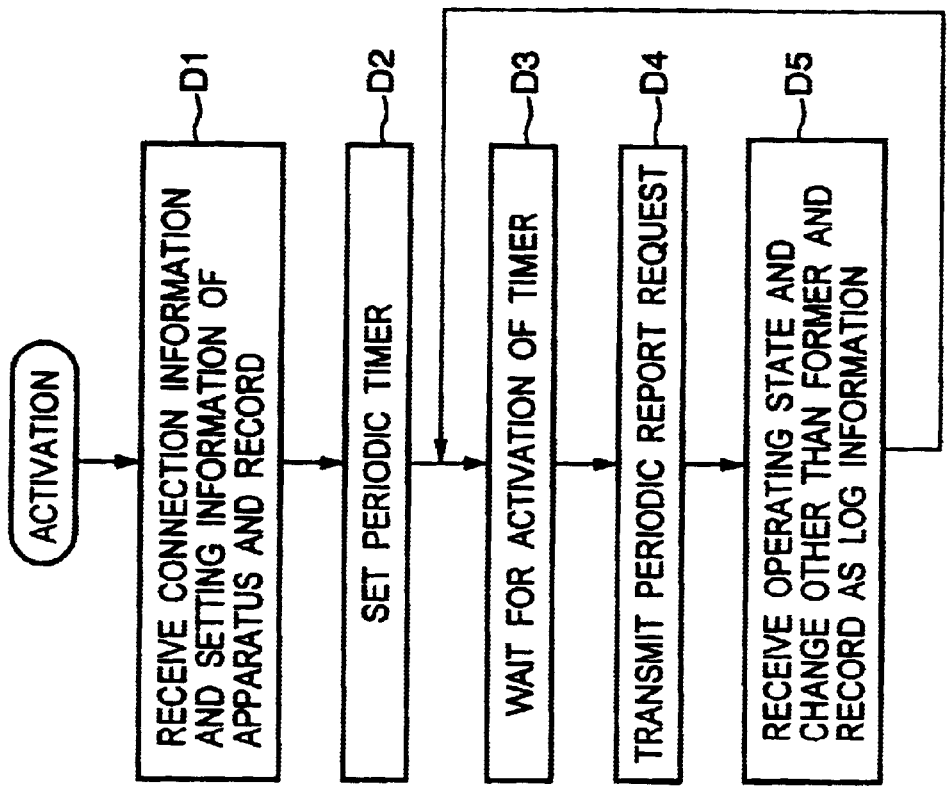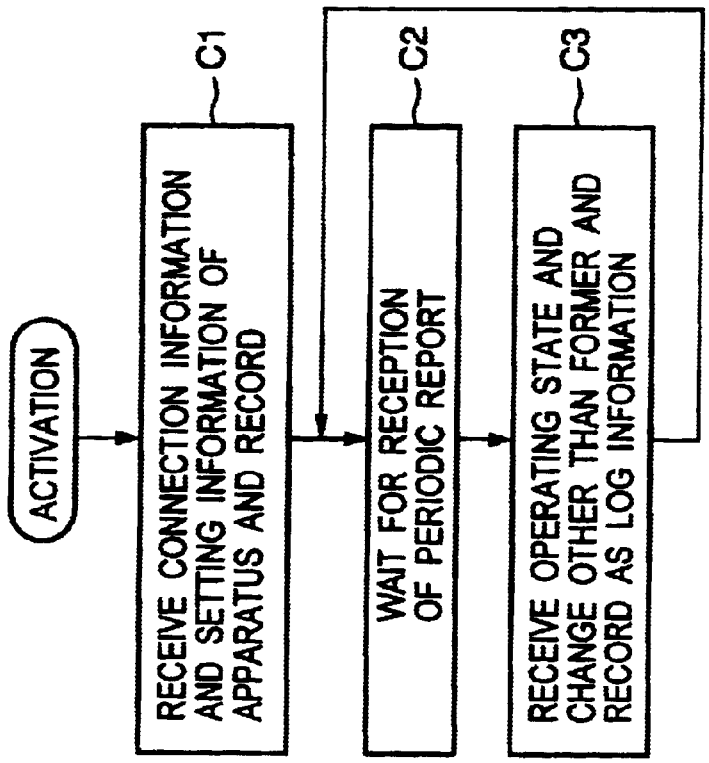

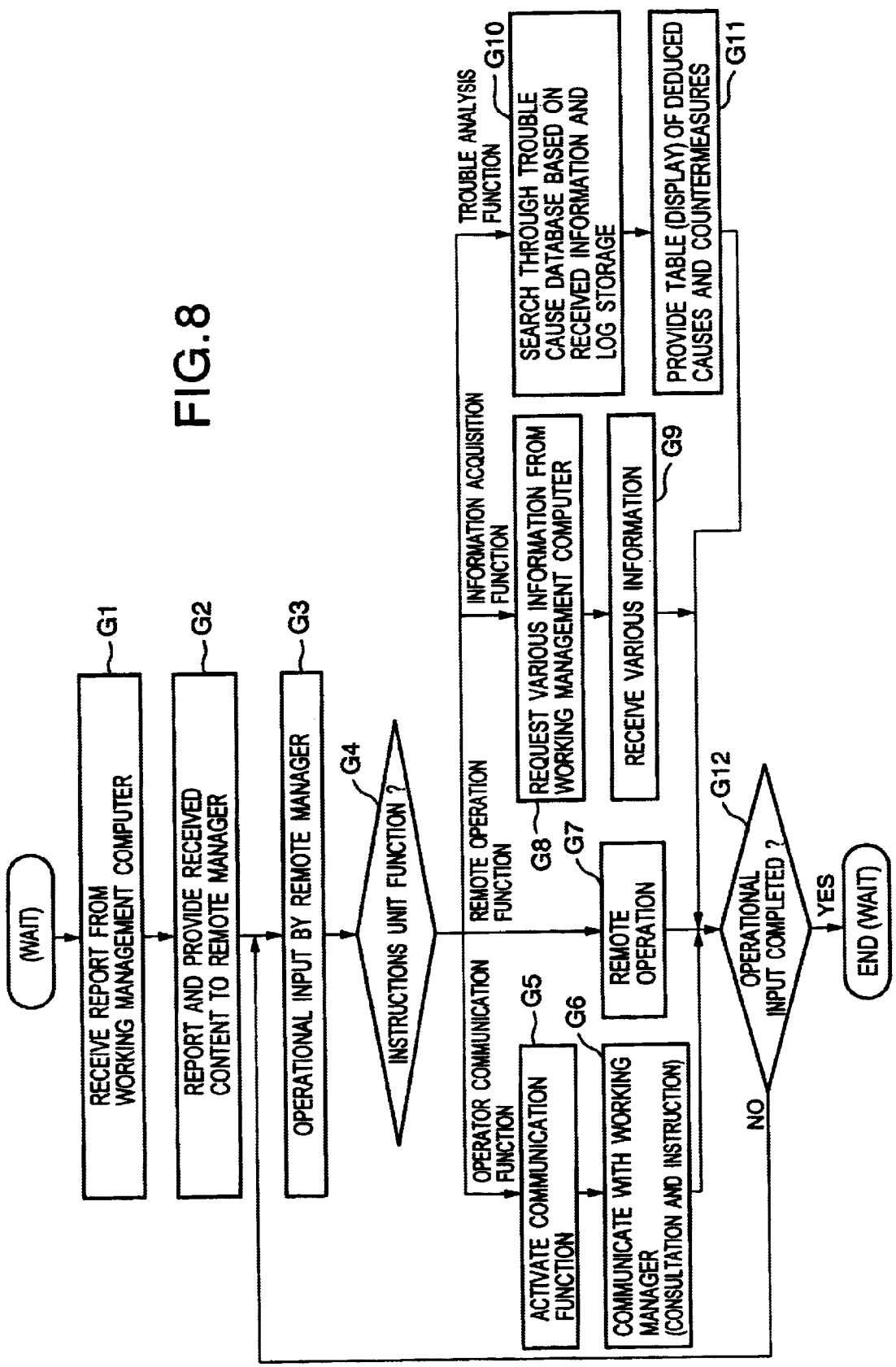

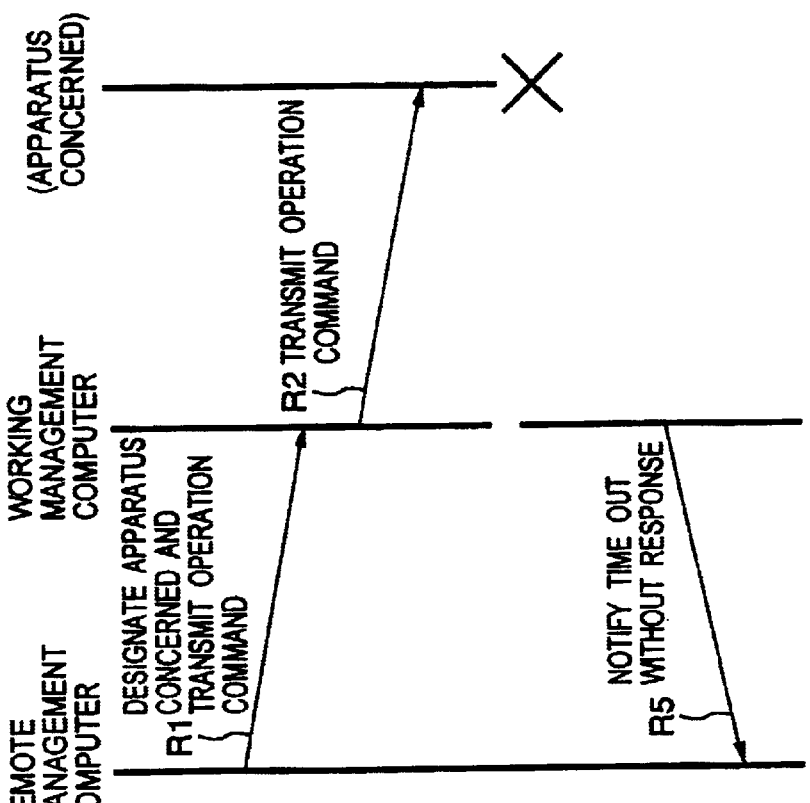
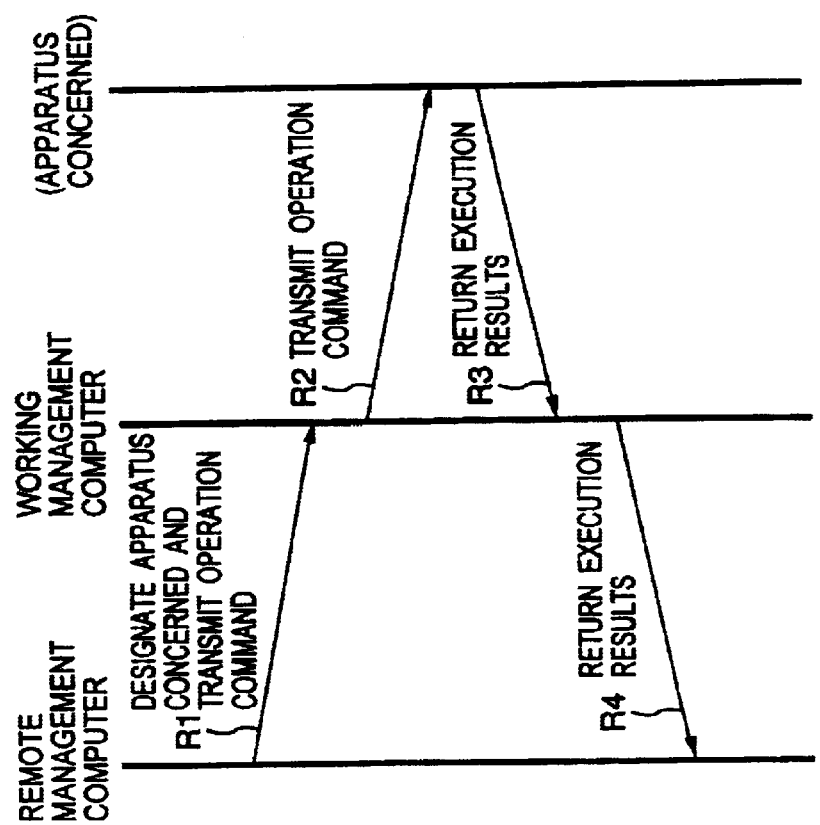

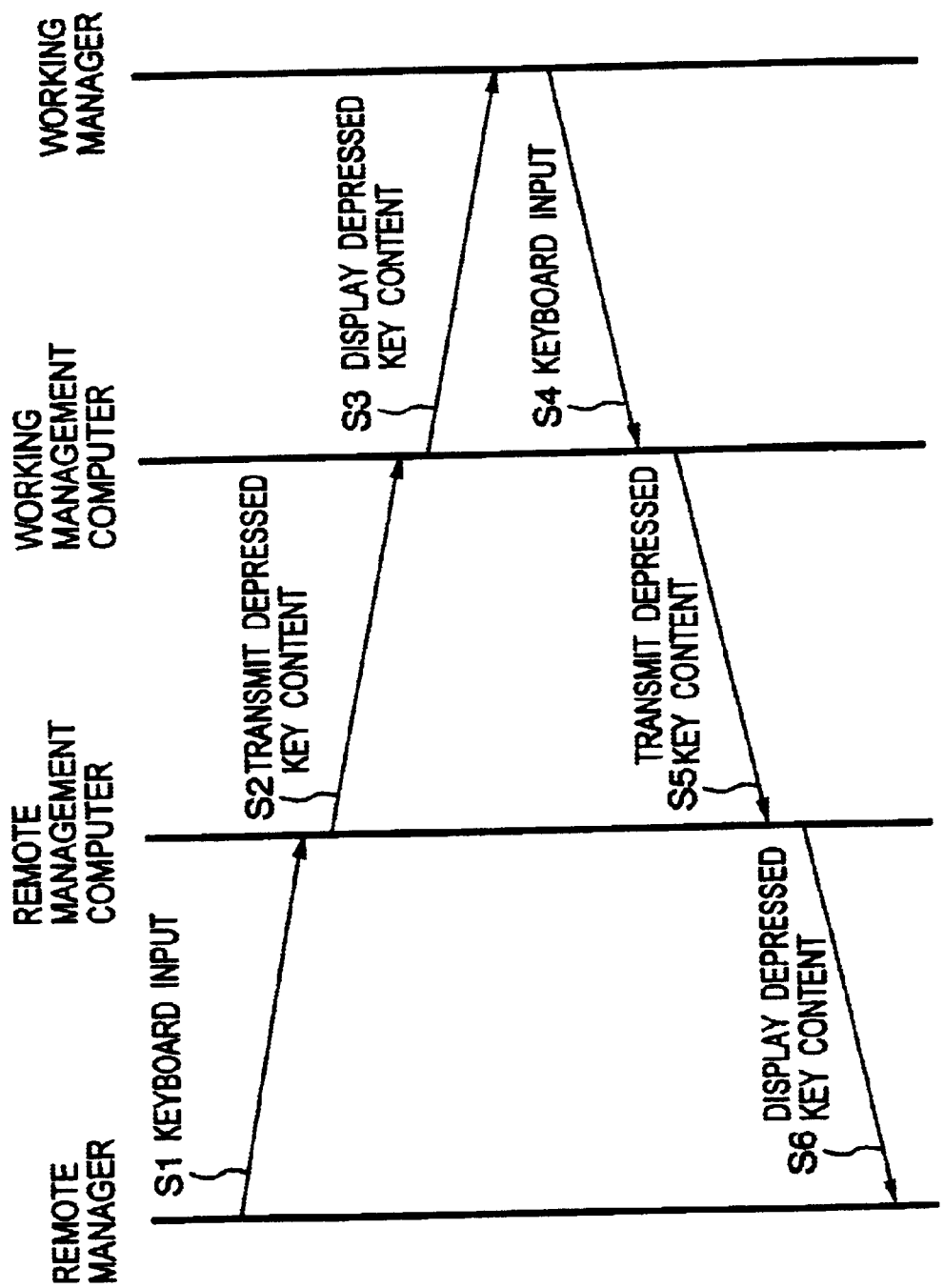

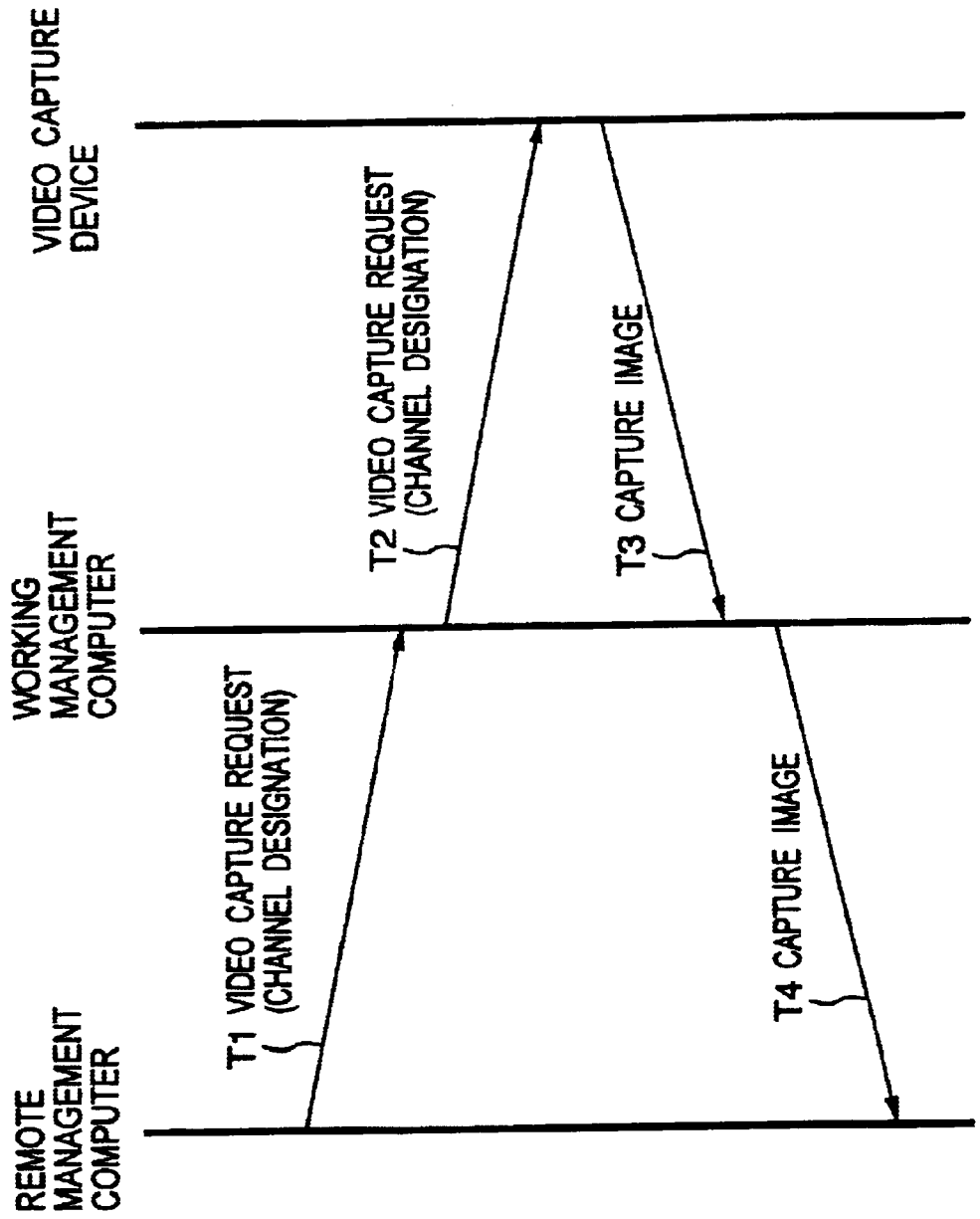

MAINTENANCE SUPPORT SYSTEM FOR ELECTRONIC APPARATUS

BACKGROUND OF THE INVENTION

1. Field of the Invention

The present invention relates to a maintenance support system for an electronic apparatus, and particularly relates to a remote control maintenance support system capable of collective, centralized management of maintenance work for an electronic apparatus, such as a video processing apparatus switching, reproducing, or processing video signals, at a remotely locate center.

2. Description of the Related Art

Conventionally, high reliability is sought for an electronic apparatus such as a video processing apparatus installed in a broadcast station etc. for use in the processing of a video signal. This is because if a breakdown affects the broadcast etc., the cost of compensating for damages becomes extremely high.

In such a video processing apparatus, redundant systems are provided at several stages so that the breakdown of one part will not cause the entire apparatus to stop functioning. A backup system is made to immediately start operating when a breakdown occurs. During the operation of the backup system, it is necessary to quickly repair the broken down apparatus before a subsequent breakdown occurs.

For this reason, in such a video processing apparatus, it is necessary to reliably perform periodic maintenance and quickly make restorative repairs when a breakdown occurs.

In the prior art, when a breakdown occurred in a video processing apparatus, the occurrence of the breakdown was indicated to an operator by a lamp or buzzer. When learning of the breakdown, the operator communicated with a maintenance center of the manufacturer by phone to request repair.

Information on the breakdown of the apparatus, the operation log, etc. required for the repair of the breakdown was obtained by a serviceman examining the broken down apparatus after the serviceman arrived at the actual location.

Contrary to this, in a remote maintenance management system disclosed in Japanese Unexamined Patent Publication No. 11-205346, the technique of reporting trouble to a remote apparatus via a communication line (public line) when trouble occurs in a general apparatus (office automation apparatus) or the like has been used.

FIG. 1 is a block diagram of the configuration of a maintenance support system for a video processing apparatus of the prior art.

The maintenance support system for the video processing apparatus of the prior art shown in FIG. 1 includes a report reception terminal 91 and a report relay device 92 connected to each other by a public telecommunications network 9 and a group of apparatuses 93 connected to the report relay device 92.

Here, when any apparatus in the group of apparatuses 93 reports trouble, the report is sent via the public telecommunications network 9 to the report reception terminal 91 at a remote location by the report relay device 92.

In the prior art, it is possible to report the occurrence of a breakdown or other abnormality. In an electronic apparatus such as a video processing apparatus, however, sometimes identification of the cause of the breakdown is difficult. Namely, there are cases where a slight abnormality occurs in generated video and cases where the breakdown must be investigated using the operation log of the apparatus. Further, there are also cases where the situation is difficult to grasp unless not just a single apparatus, but the processing system of the video signal as a whole, is investigated.

The remote maintenance system of the prior art could not handle such disadvantages in the maintenance work for an electronic apparatus such as a video processing apparatus.

SUMMARY OF THE INVENTION

An object of the present invention is to provide a maintenance support system of an electronic apparatus capable of collectively and centrally acquiring the information required for maintenance work at a remotely located center.

According to the present invention, there is provided a maintenance support system for an electronic apparatus, having one or more electronic processing systems for carrying out the predetermined processing provided with an electronic apparatus, and a remote management center connected to each of the electronic processing systems via a public telecommunications network so that two-way communication is possible, and wherein each of the electronic processing systems comprises a means for transmitting to the remote management center connection information and setting information concerning setting of the electronic apparatus and a problem notification or information notifying occurrence of a problem or trouble of the electronic apparatus, and wherein the remote management center comprises: a mean s for reporting the notification of occurrence of a problem in the remote management center when receiving a notification of occurrence of a problem of an electronic apparatus from an electronic processing system, a means for receiving a notification of occurrence of a problem and configuring a reproduction use electronic apparatus having substantially the same connection and setting as the connection and setting of the electronic apparatus in the remote management center at a point of time when it receives the notification of occurrence of a problem, and a means for reproducing on the reproduction use electronic apparatus the state when the problem occurred by executing the same operation as the operation of the electronic apparatus at the point of time when it received the notification of occurrence of a problem.

Preferably, each of the electronic processing systems comprises: an operation log storage means for storing operations on the electronic apparatus, and a means for transmitting the stored content of the operation log storage means to the remote management center periodically or when requested by the remote management center or when the stored content reaches a predetermined level.

Further preferably, the remote management center comprises: a log storage database provided with storage areas corresponding to the electronic processing systems, a means for receiving the stored content of the operation log storage means from the electronic processing systems and storing it in the log storage database, and a means for receiving the notification of occurrence of a problem and tracing back and executing on the reproduction use electronic apparatus the operations on the electronic apparatus stored in the log storage database so as to reproduce the conditions at the time of occurrence of the problem.

Further preferably, each of the electronic processing systems comprises a means for transmitting information relating to the operating state of the electronic apparatus sampled at a predetermined period to the remove management center.

Further preferably, the remote management center comprises: a log storage database provided with storage areas corresponding to the electronic processing systems, a means for receiving the connection information and information concerning setting of the electronic apparatus and information relating to the operating state of the electronic apparatus sampled at predetermined periods from the electronic processing systems and storing it in the log storage database, a means for receiving a notification of occurrence of a problem and configuring in the remote management center a reproduction use electronic apparatus having substantially the same connection and setting as that electronic apparatus in the electronic processing system based on the connection information and information relating to the setting of the electronic apparatus stored in the log storage database, and a means for tracing back and executing the same operations as the operations of the electronic apparatus stored in the log storage database so as to reproduce the state at the time of occurrence of the problem on the reproduction use electronic apparatus.

Still further preferably, the remote management center comprises: a means for transmitting operational inputs including designation of operational apparatuses and/or speech information from an operator in the remote management center to the electronic processing system, and a means for receiving and displaying operational inputs and speech information from an operator in the electronic processing system.

Further preferably, each of the electronic processing systems comprises: a means for displaying the operational input and/or speech information from the remote management center, and a means for transmitting operational inputs and/or speech information from an operator in the electronic processing system to the remote management center.

Specifically, the electronic apparatus is a video processing apparatus used for the processing of a video signal, and at least one of the electronic processing systems is a video processing system including the video processing apparatus.

Preferably, the video processing system comprises a means for capturing a still image from a video apparatus designated by a video capture command from the remote management center, then transmitting the captured still image to the remote management center.

Further preferably, the remote management apparatus comprises: a means for searching back through the operation log stored in the log storage database up to a predetermined time of operation for an error relating to the operation based on the information received from the electronic processing system, and a means for searching through a problem cause database for the possibility of error relating to the configuration and setting of the system.

Preferably, the remote management center comprises a means for retrieving the problem of the apparatus in the electronic processing system from a problem cause database based on information received from the electronic processing system and the setting and operation log of the apparatus stored in a log storage database.

Specifically, the Internet is used as the public telecommunications network.

BRIEF DESCRIPTION OF THE DRAWINGS

These and other objects and features of the present invention will become clearer from the following description of the preferred embodiments given with reference to the accompanying drawings, in which:

FIGS. 5A and 5B are flowcharts of the periodic report reception operation from the working management computer in the remote management computer of the maintenance support system for the electronic apparatus in the case where a video processing system is shown as an example of the electronic processing system according to an embodiment of the present invention;

FIG. 8 is a flowchart of operations for abnormality countermeasures and abnormality analysis in a remote management computer of the maintenance support system for the electronic apparatus in the case where a video processing system is shown as an example of the electronic processing system according to an embodiment of the present invention;

FIGS. 9A and 9B are communication sequence diagrams of the remote operation of the maintenance support system for the electronic apparatus in the case where a video processing apparatus is shown as an example of the electronic apparatus according to an embodiment of the present invention;

FIG. 10 is a communication sequence diagram of an operator communication function of the maintenance support system for the electronic apparatus according to an embodiment of the present invention;

FIG. 11 is a communication sequence diagram of a video capture operation of the maintenance support system for the electronic apparatus in the case where a video processing apparatus is included in the electronic apparatus according to an embodiment of the present invention;

DESCRIPTION OF THE PREFERRED EMBODIMENTS

Figure 1:
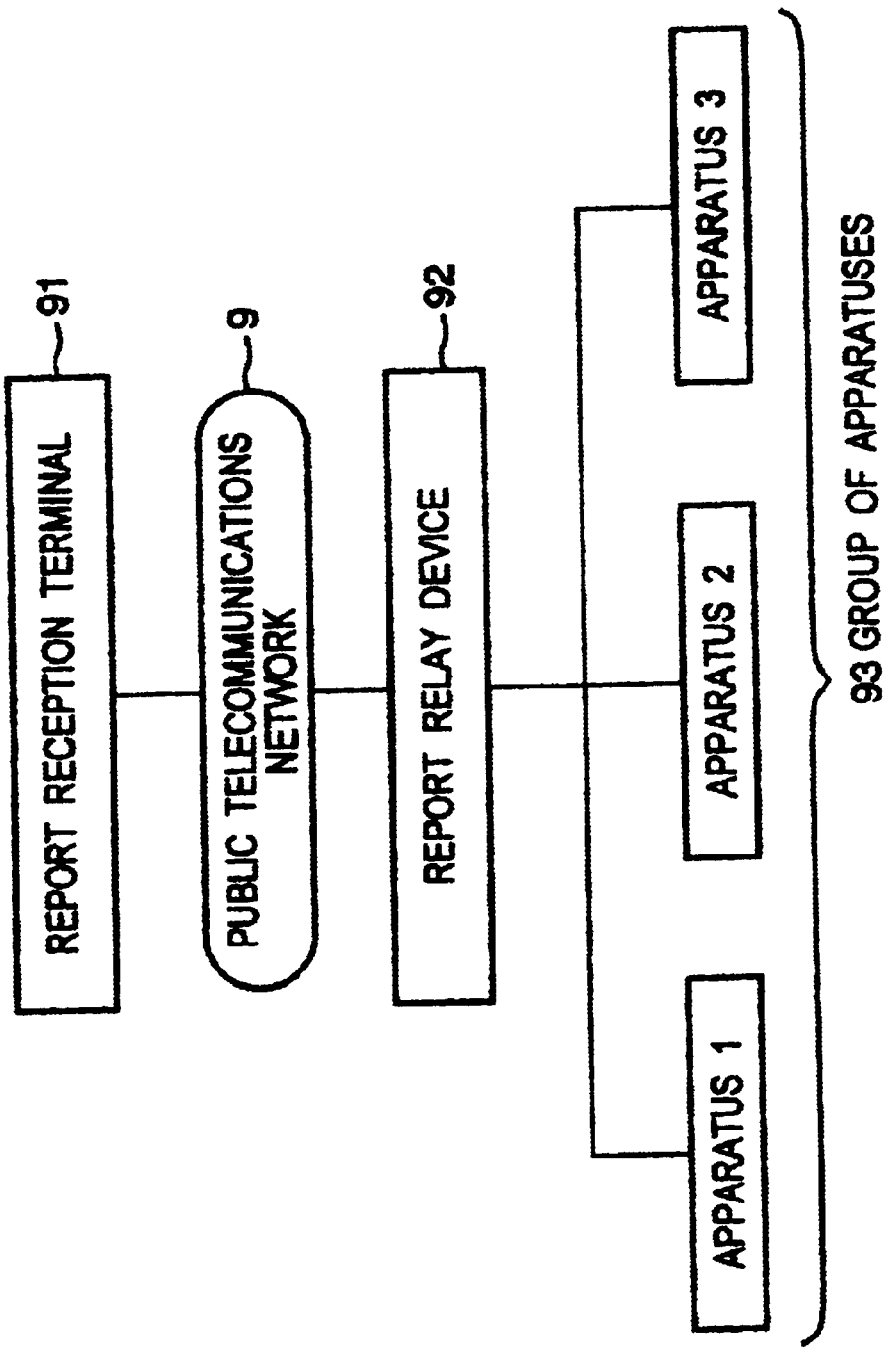
FIG. 1 is a block diagram of the configuration of the maintenance support system for the electronic apparatus of the prior art.

Below, an explanation will be given of an embodiment of the present invention by referring to the drawings.

Figure 2:
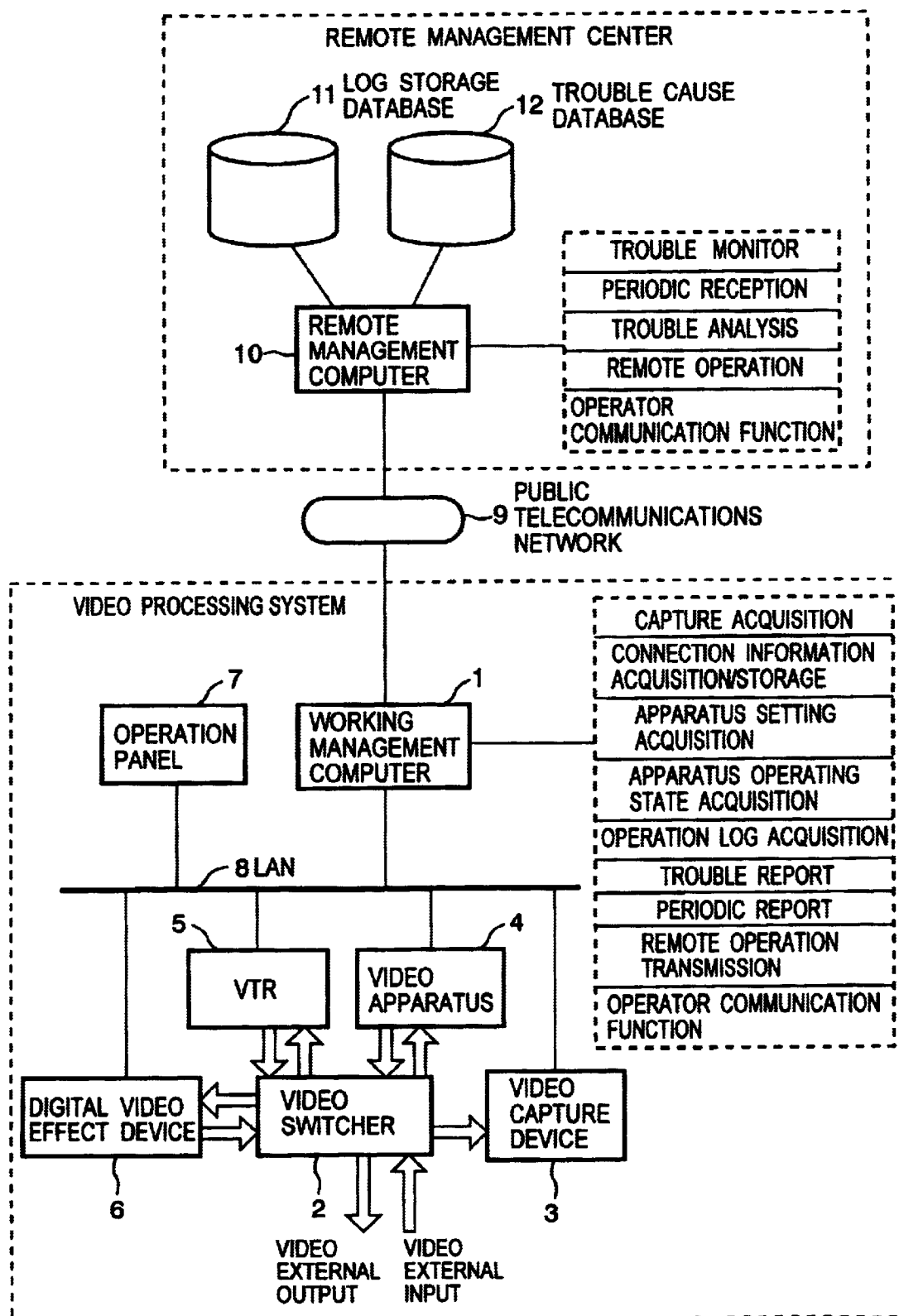
FIG. 2 is a block diagram of a standard configuration of a maintenance support system for an electronic apparatus in the case where a video processing apparatus is shown as an example of the electronic apparatus according to an embodiment of the present invention.

FIG. 2 is a block diagram of a standard configuration of a maintenance support system for an electronic apparatus in the case where a video processing apparatus is shown as an example of the electronic apparatus according to an embodiment of the present invention.

In the standard configuration of the maintenance support system for the video processing apparatus according to the present embodiment, a video processing system and the remote management center are connected via the public telecommunications network 9. The video processing system includes a working management computer 1 for field management, a video switcher 2 for selecting a video signal from an input of a plurality of video signals and outputting the same, a video capture device 3 for taking out a single frame of the video signal and using it as a still image, a video apparatus 4 for performing various processing on the video signal, a reproduction apparatus of the video, that is, a VTR 5, acting as the source of the video signal, a digital video effect. device 6 for applying a specific effect to the video signal, an operation panel 7 used for the operational input of the apparatus, a LAN 8 connected to each apparatus in the video processing system and transmitting the information, and a public telecommunications network 9 connecting the video processing system and the remote management center.

Also, the remote management center includes a remote management computer 10 for remote management, a log storage database 11 connected to the remote management computer 10 for use by the remote management computer 10 for storage of information, and a problem cause database 12 for holding combinations of status information and causes when a problem occurs in an apparatus of the video processing system.

In the maintenance support system of the video processing apparatus according to the present embodiment, other than the above configuration, although omitted in FIG. 2, a reproduction use system shown in FIG. 16 mentioned later is connected to the remote management computer 10.

Note that the problem cause database 12 is used for deducing the cause considered from the combination of the states, but it is possible to hold information of countermeasures in accordance with the causes.

Also, the white arrows in the figure show general routes of the video signal.

The working management computer 1 communicates with each apparatus via the LAN 8 and communicates with the remote management computer 10 via the public telecommunications network 9. In the figure, the functions described in the broken line boxes on the right side of the working management computer 10 show the functions to be achieved by the working management computer 10.

Below, an explanation will be given of the functions achieved by the working management computer 1.

The "capture acquisition" function instructs the video capture device 3 to take out one frame of an image from the video signal as a still image and receives the same. When requested from the remote management computer 10, it further transmits the still image.

The "connection information acquisition/storage" function is the acquisition/storage function of the connection information concerning the connection of the routes of video signals among the apparatuses. The information concerning the connection of the routes of the video signals among the apparatuses is decided at the time of installation of the system and stored in the working management computer 1 (in an internal storage device) by the input of the operator.

Note that it is also possible to configure it so as to provide a function of transmission and detection of a test signal for detecting the connections of the routes of the video signals at an input/output unit of the video signal of each apparatus, and to enable automatic detection of the connections by instruction, and to acquire the results at the working management computer 1.

The "apparatus setting acquisition" function and the "apparatus operating state acquisition" function are functions for acquiring states of various switches of the apparatuses, the selected setting such as a corresponding signal format, the operating state such as the state of various electrical signals in the apparatuses, and so on by communicating with the apparatuses (for example, the video switcher 2, the characterizing component of the present invention, contains information by what routes the video signals flow).

As the apparatus operating state, the parameters of the device for special effects or the state of the effect in execution (parameters in progress), the information of the material being reproduced in a reproduction apparatus such as a VTR, the position (time code) information on a time axis being reproduced, and also the content of a memory of the control device etc., are included.

The "operation log acquisition" function is a function of recording the content of operational input from the operation panel 7, etc. The operational input becomes the commands transmitted onto the LAN 8, so is monitored and recorded. Alternatively, it is a function for successively receiving the content of operational input from the operation panel 7.

The recorded content is transmitted together with the other information to the remote management computer 10 periodically or when transmission is requested from the remote management computer 10, when the amount reaches a predetermined level, or when communication occurs for another reason. After the transmission, the transmitted content is erased.

The "abnormality report" function is a function for receiving a report from an apparatus where a problem occurs when the problem occurs in the video apparatus in the video processing system and transferring it (a problem notification) to the remote management computer 10. Alternatively, it is reported to the remote management computer 10 when a problem occurs in the function of the working management computer 1 per se or the state of the LAN 8.

The "periodic report" function is a function for periodically transmitting the information (e.g., connection information, setting information, state information) collected in the video processing system to the remote management computer 10.

The "remote operation transmission" function is a function for relaying a command from the remote management computer 10 to a designated apparatus. Further, a response with respect to that is relayed in the reverse direction.

The "operator communication" function is a function for providing dialog-like communication between the operator of the remote management computer 10 (remote manager) and the operator of the working management computer 1 (working manager). By reflecting the input of one in the display of the other, dialog of the two is enabled. Further, it is also possible to realize mutual transmission and reception of e-mail.

The remote management computer 10 communicates with the working management computer 1 via the public telecommunications network 9 and achieves functions as described in the broken line boxes on the right side of the remote management computer 10 shown in FIG. 2.

Below, an explanation will be given of the functions of the remote management computer 10 of the remote management center.

The "abnormality monitoring" function is a function for receiving a report of a problem of an apparatus from the working management computer 1 and reporting it by display or sound to report it to the remote manager and inform the remote manager of the content of the problem.

The "periodic reception" function is a function for periodically receiving various information of the video processing system (connection and setting information, operating states, etc.) from the working management computer 1 and recording (storing) the same in the log storage database 11. Also, even when receiving information of the operation log, it records the same in the log storage database 11 in the same way as that described above.

The "abnormality analysis" function is a function for searching through the problem cause database 12 based on the content of the received report of the problem and the content of the log storage database 11 and displaying possible causes (and countermeasures). Also, this function is provided with a function of notifying the working management computer 1 of the problem. Further, as part of the processing function, it is provided with a reproduction processing function from maintenance personnel in the remote management center receiving the report. Details thereof will be mentioned later by referring to FIGS. 16 and 17.

The "remote operation" function is a function for transmitting the designation of the apparatus and operational commands to the working management computer 1 by operational instructions to a certain apparatus input by the remote manager. Also, it is provided with a function of receiving the response of the result thereof via the working management computer 1 and displaying the same.

The operator communication function provides dialog-like communication between the remote manager and the working manager.

Figure 3A:
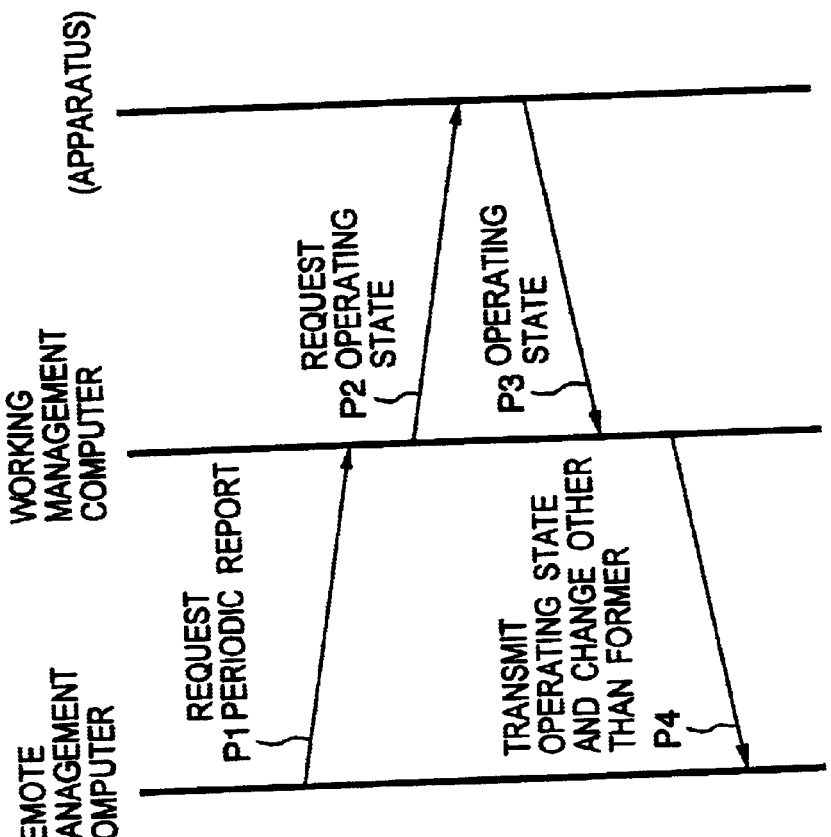
FIGS. 3A and 3B are communication sequence diagrams of a periodic report transmission operation from a working management computer to a remote management computer of the maintenance support system for the electronic apparatus according to an embodiment of the present invention.
Figure 3B:
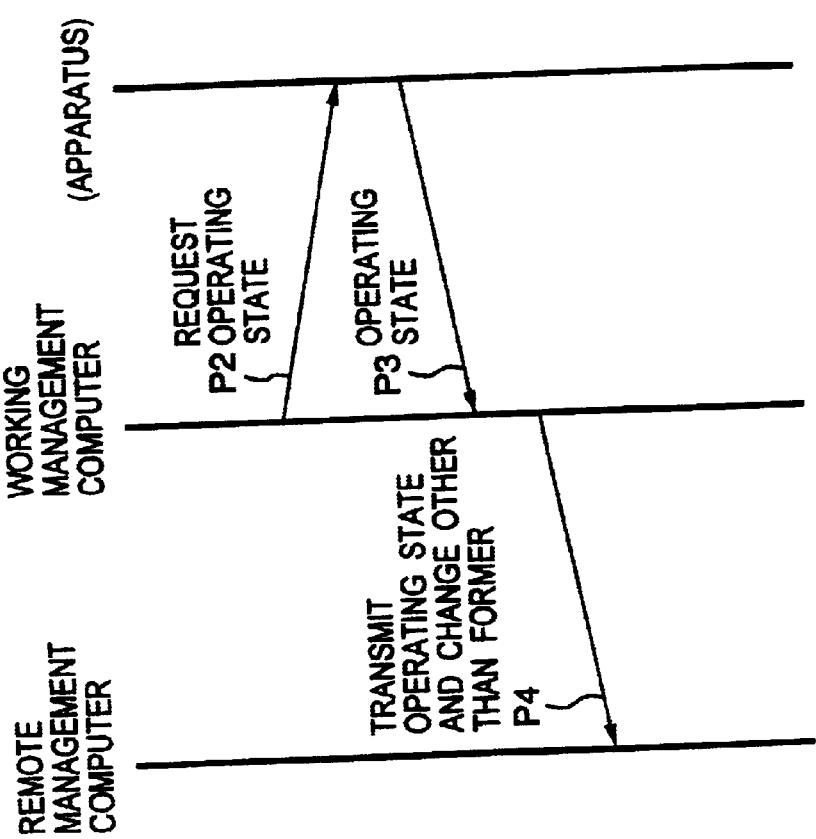

FIGS. 3A and 3B are communication sequence diagrams showing the periodic report transmission operation from the working management computer to the remote management computer of the maintenance support system for the electronic apparatus in the case where a video processing apparatus is shown as an example of the electronic apparatus according to an embodiment of the present invention.

In the communication sequence diagram shown in FIG. 3A, an operating state request program periodically activated by a timer built in the working management computer 1 transmits an operating state request P2 to all apparatuses in the video processing system and receives an operating state P3 from each of the apparatuses. The working management computer 1 adds any changes and transmits the result to the remote management computer 10 if there are changes in the setting etc. or if there is a new operation log in comparison with that at a point of time of the periodic report transmitted to the remote management computer 10 the previous time.

The communication sequence diagram shown in FIG. 3B shows a case where the operating state request program is periodically activated by the timer built in the remote management computer 10. First, a periodic report request P1 is transmitted from the remote management computer 10 to the working management computer 1, then the sequence becomes similar to the case of the communication sequence diagram shown in FIG. 3A described above.

In the system according to the present invention, no matter which of the sequence of FIG. 3A or 3B is executed, the same effects can be achieved.

Figure 4A:
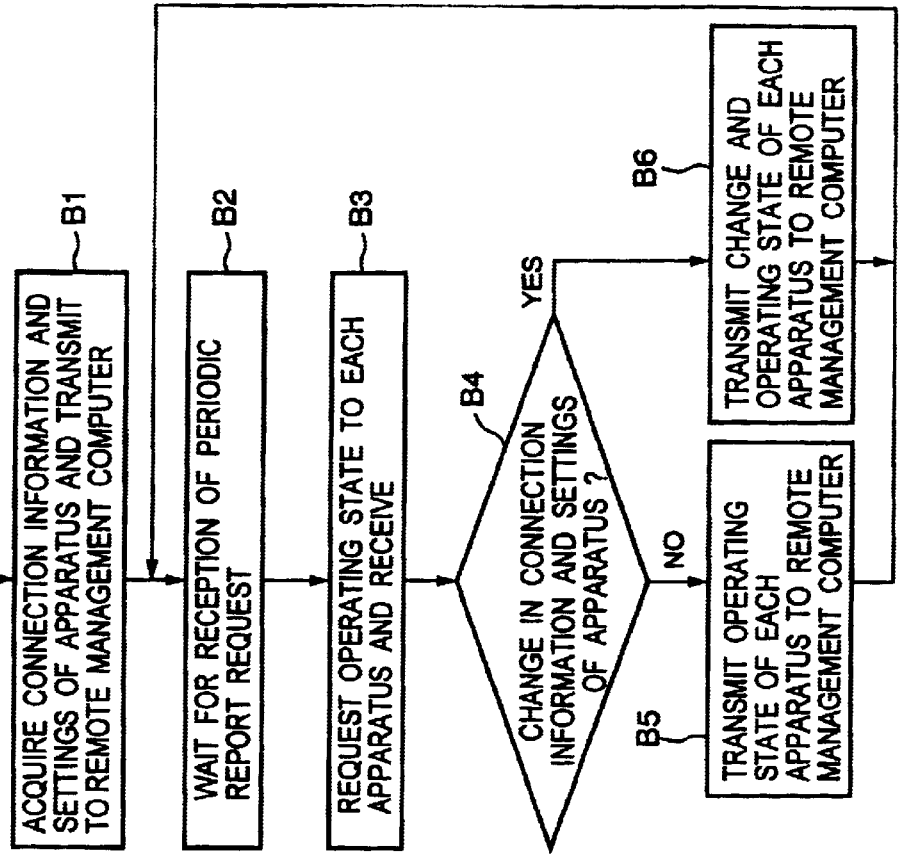
FIGS. 4A and 4B are flowcharts of the periodic report transmission operation from the working management computer to the remote management computer of the maintenance support system for the electronic apparatus in the case where a video processing apparatus is shown as an example of the electronic apparatus according to an embodiment of the present invention.
Figure 4B:
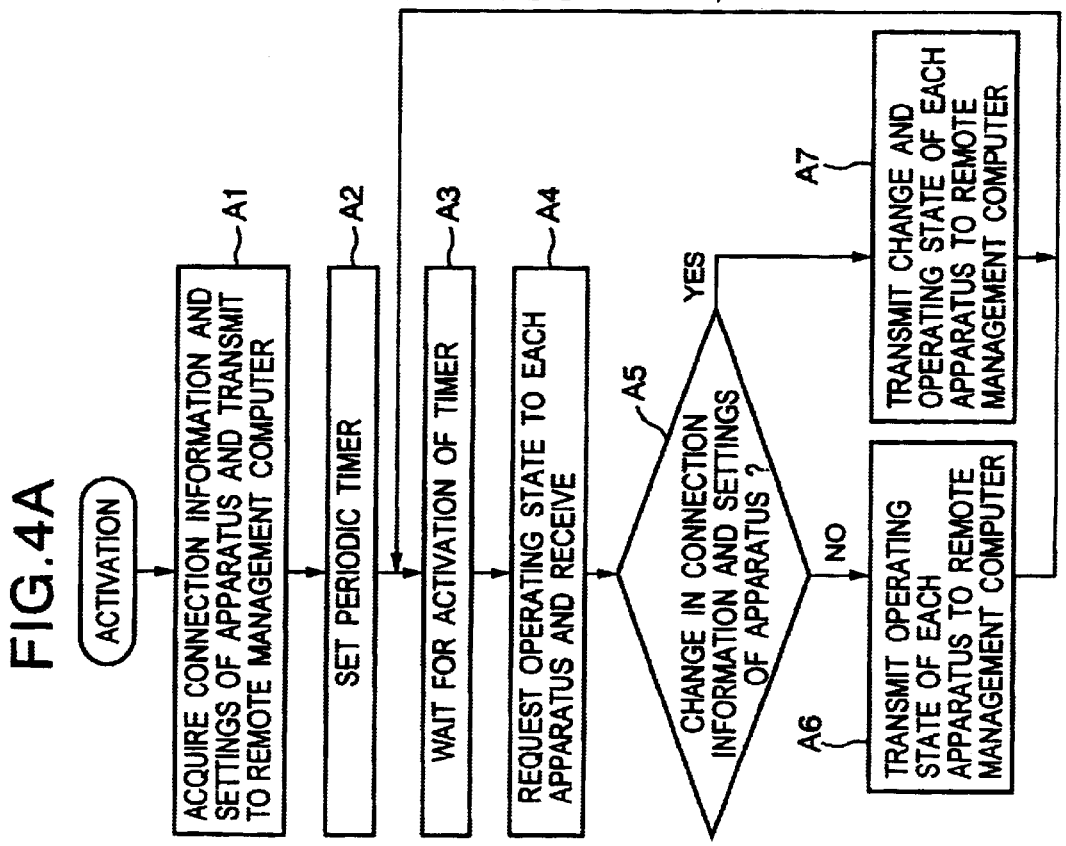

FIGS. 4A and 4B are flowcharts of the periodic report transmission operation from the working management computer to the remote management computer of the maintenance support system for the electronic apparatus in the case where a video processing apparatus is shown as an example of the electronic apparatus according to an embodiment of the present invention.

The flowcharts shown in FIGS. 4A and 4B correspond to the communication sequence diagrams shown in FIGS. 3A and 3B.

Below, an explanation will be given of the periodic report transmission operation from the working management computer 1 to the remote management computer 10 of the maintenance support system for the electronic apparatus in the case where a video processing apparatus is shown as an example of the electronic apparatus according to the present embodiment by using the flowcharts shown in FIGS. 4A and 4B while referring to FIGS. 2, 3A and 3B.

First, an explanation will be given of the flowchart of FIG. 4A showing the operation of the periodic report transmission processing periodically activated by the timer built in the working management computer 1.

After the remote management computer 10 and the working management computer 1 are activated and communication is established, first, at step Al, the connection information and setting of each apparatus in the video processing system are transmitted from the working management computer 1 to the remote management computer 10.

At step A2, the working management computer 1 sets the timer built in it.

At step A3, the working management computer 1 waits until the time set in the timer.

At step A4, the working management computer 1 requests information indicating the operating state with respect to each apparatus in the video processing system upon receipt of a sign from the timer, then receives the information.

At step A5, it is verified whether or not there is a certain change in the connection information and the information indicating the setting of the apparatus transmitted to the remote management computer 10 the previous time the information was stored in the working management computer 1.

If there is no change, at step A6, information indicating the operating state of each apparatus is transmitted to the remote management computer 10, then the routine shifts to step A3, and the series of processing of step A3 on is repeated.

If there is a change at step A5, at step A7, the change is added to the information indicating the operating states of the apparatuses and transmitted to the remote management computer 10, and then the operation routine shifts to step A3, where the series of processing of step A3 and the following steps is repeated.

Next, an explanation will be given of the flowchart of FIG. 4B showing a periodic report transmission operation performed in response to a periodic report request from the remote management computer 10.

After the remote management computer 10 and the working management computer 1 are activated and communication is established, first, at step B1, the connection information and the setting are transmitted from the working management computer 1 to the remote management computer 10.

At step B2, the working management computer 1 enters into a state waiting for reception of a periodic report request from the remote management computer 10.

At step B3, the working management computer 1 receives a periodic report request, requests information indicating the operating state with respect to the apparatuses in the video processing system, and then receives the information.

At step B4, it verifies whether or not there is a certain change exists in the connection information and the information indicating the setting of the apparatuses transmitted to the remote management computer 10 the previous time the information was stored in the working management computer 1.

When there is no change, at step B5, information indicating the operating states of the apparatuses are transmitted to the remote management computer 10, then the routine shifts to step B2, and the series of processing of step B2 and the following steps are repeated.

When there is a change, at step B6, the change is added to the information indicating the operating states of the apparatuses and transmitted to the remote management computer 10, and then the routine shifts to step B2, where the series of. processing of step B2 and the following steps are repeated.

FIGS. 5A and 5B show flowcharts of the periodic report reception operation from the working management computer in the remote management computer of the maintenance support system of the electronic apparatus in the case where the video processing system is shown as an example of the electronic processing system according to an embodiment of the present invention.

The flowcharts shown in FIGS. 5A and 5B correspond to the communication sequence diagrams shown in FIGS. 3A and 3B.

Below, an explanation will be given of the periodic report reception operation from the working management computer 1 in the remote management computer 10 of the maintenance support system of the video processing apparatus according to the present embodiment by using the flowcharts shown in FIGS. 5A and 5B and while referring to FIGS. 2, 3A and 3B.

First, an explanation will be given of the operation of the reception of the periodic report periodically transmitted from the working management computer 1.

First, at step C1, the remote management computer 10 receives and records the connection information and the setting of the apparatuses in the video processing system from the working management computer 1.

At step C2, the remote management computer 10 waits for the reception of a periodic report from the working management computer 1.

At step C3, the remote management computer 10 receives a periodic report from the working management computer 1, receives information concerning the operating states of the apparatuses in the video processing system and changes other than the former, and records the same as the log information in the log storage database 11.

Next, an explanation will be given of the operation of the periodic report request processing periodically activated by the timer built in the remote management computer 10.

At step D1, the remote management computer 10 receives the connection information and the information of the setting of the apparatuses in the video processing system from the working management computer 1 and records the same.

At step D2, the remote management computer 10 sets the timer built in itself.

At step D3, the remote management computer 10 waits until the time set in the timer.

At step D4, the remote management computer 10 requests the transmission of the periodic report to the working management computer 1 upon receipt of a sign from the timer.

At step D5, the remote management computer 10 receives a periodic report from the working management computer 1, receives the information concerning the operating states of the apparatuses in the video processing system and the changes other than the former, and records the same as the log information in the log state database 11.

Figure 6B:
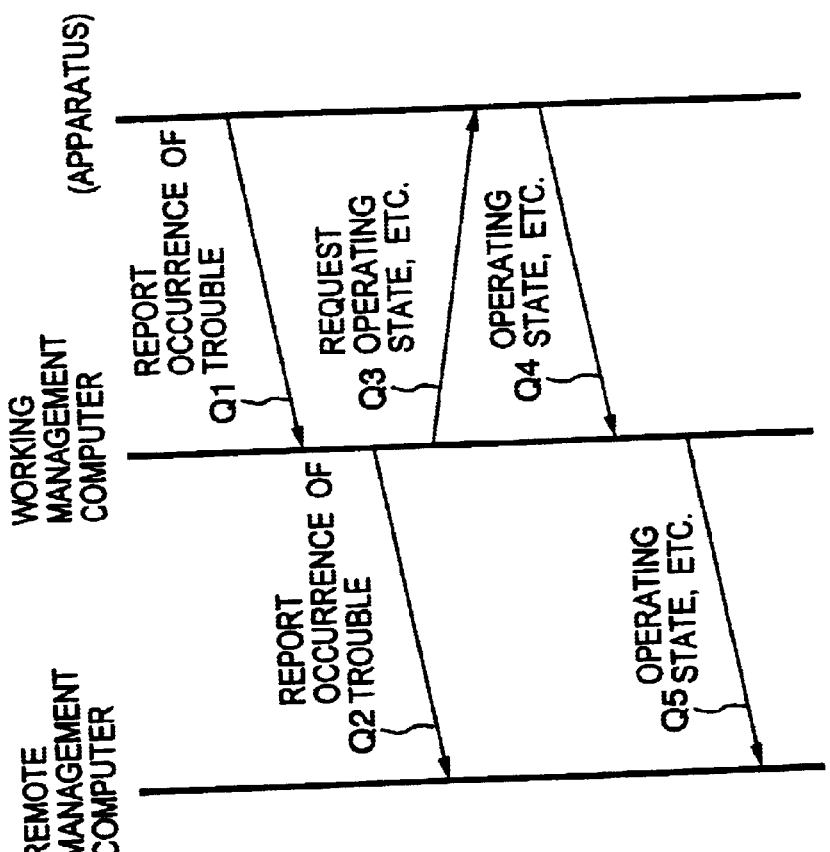
FIGS. 6A and 6B are communication sequence diagrams of an operation at an occurrence of a problem in an apparatus in an electronic processing system of the maintenance support system for the electronic apparatus in the case where a video processing system is shown as an example of the electronic processing system according to an embodiment of the present invention.
Figure 6A:
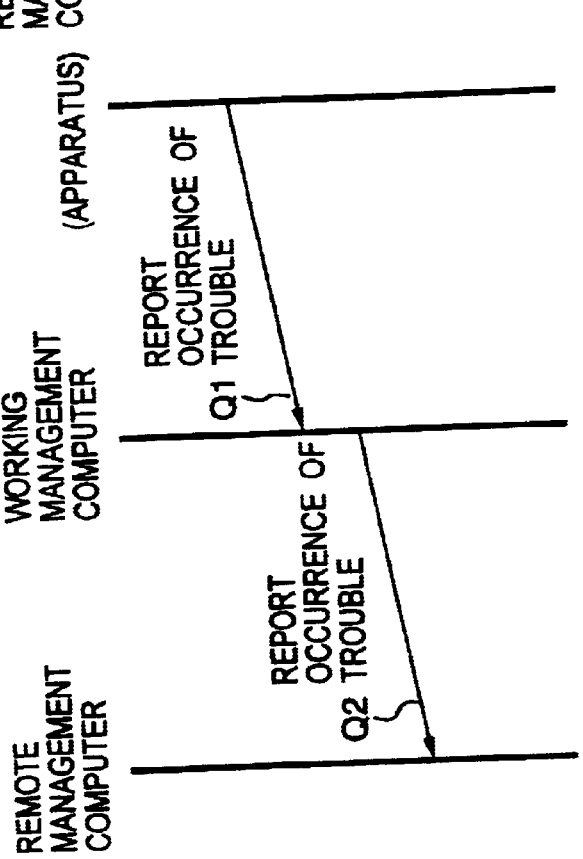

FIGS. 6A and 6B are communication sequence diagrams showing the operation at the time of occurrence of a problem of each apparatus in the electronic processing system of the maintenance support system of the electronic apparatus according to an embodiment of the present invention.

FIG. 6A is a communication sequence diagram of the operation in a case where only the report of occurrence of a problem is sent. In this case, the content (type) of the problem is determined in advance by numbers or the like, the numbers are added, and the problem is reported.

When one among the apparatuses of the video processing system suffers from a problem, a report Q1 of occurrence of a problem is transmitted from the apparatus to the working management computer 1. The report is further transmitted as a report Q2 of occurrence of a problem from the working management computer 1 to the remote management computer 10.

FIG. 6B is a communication sequence diagram showing the operation in a case where related information is continuously transferred after the report of occurrence of a problem. Preferably, after the report is transferred, that is, after the communication sequence shown in FIG. 6A, the working management computer 1 must request and collect information concerning the problem for the apparatus where the problem occurred and other apparatuses (these portions are indicated by an operating state etc. request Q3 and an operating state etc. request Q4), and the collected information concerning the problem must be transferred from the working management computer 1 to the remote management computer 10 (this portion is indicated as an operating state etc. Q5).

Figure 7A:
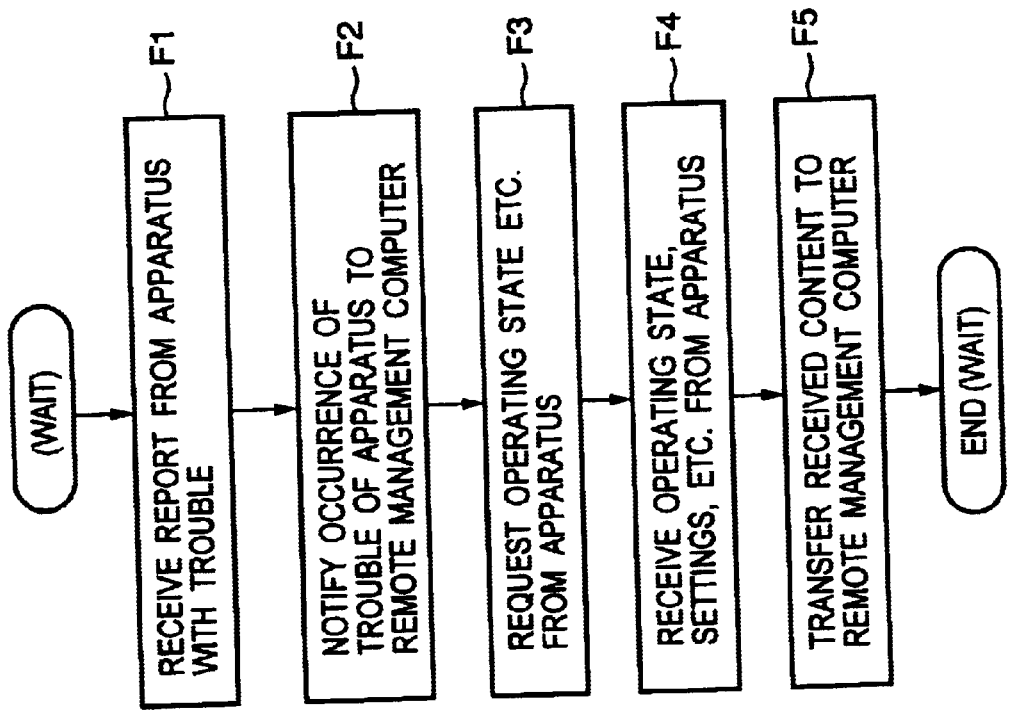
FIGS. 7A and 7B are flowcharts of the operation at the occurrence of a problem in an apparatus in an electronic processing system of the maintenance support system for the electronic apparatus in the case where a video processing system is shown as an example of the electronic processing system according to an embodiment of the present invention.
Figure 7B:
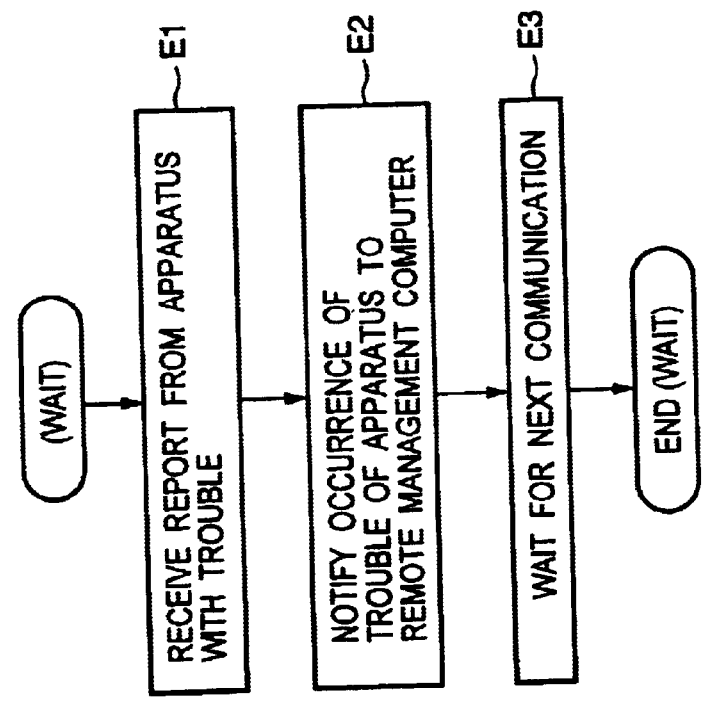

FIGS. 7A and 7B show flowcharts of the operation at the time of occurrence of a problem of each apparatus in the electronic processing system of the maintenance support system of the electronic apparatus in the case where a video processing system is shown as an example of the electronic processing system according to an embodiment of the present invention.

The flowcharts shown in FIGS. 7A and 7B correspond to the communication sequences shown in FIGS. 6A and 6B.

Below, an explanation will be given of the operation at the time of occurrence of a problem of apparatuses in the electronic processing system of the maintenance support system of the electronic processing apparatus in the case where a video processing system is shown as an example of the electronic processing system according to the present embodiment by using the flowcharts shown in FIGS. 7A and 7B while referring to FIGS. 2, 6A and 6B.

First, an explanation will be given of the flowchart shown in FIG. 7A.

First, at step E, the working management computer 1 receives a report Q1 of occurrence of a problem from the apparatus with the problem caused in the video processing system.

At step E2, the working management computer 1 further transmits a report Q1 of occurrence of a problem as the report Q2 of occurrence of a problem to the remote management computer 10.

At step E3, the working management computer 1 enters a state waiting for a next report etc. of occurrence of a problem from the apparatus in the video processing system and waits.

Next, an explanation will be given of the flowchart shown in FIG. 7B.

First, at step F1, the working management computer 1 receives the report Q1 of occurrence of a problem from the apparatus with the problem that occurred in the video processing system.

At step F2, the working management computer 1 further transmits a report of occurrence of a problem as a report Q2 of occurrence of a problem to the remote management computer 10.

At step F3, the working management computer 1 requests the information of the operating states etc. with respect to the apparatus in the video processing system.

At step F4, the working management computer 1 receives information such as the operating states etc. from the apparatus in the video processing system.

At step F5, the working management computer 1 further transmits the received information of the operating states etc. to the remote management computer 10.

Note that preferably the working management computer 1 also reports occurrence of a problem to the working manager in the video processing system by reporting the same by sound or display corresponding to the occurrence of a problem.

FIG. 8 is a flowchart of the operation of the problem countermeasure and abnormality analysis in the remote management computer of the maintenance support system of the electronic apparatus in the case where a video processing system is shown as an example of the electronic processing system according to an embodiment of the present invention.

The flowchart shown in FIG. 8 corresponds to the case of FIG. 6A, but there is almost no difference also in the case of FIG. 6B. In FIG. 6B, only the first reception portion is comprised of two stages.

Below, an explanation will be given of the operation of the problem countermeasure and abnormality analysis in the remote management computer 10 of the maintenance support system of the electronic apparatus in the case where a video processing system is shown as an example of the electronic processing system according to the present embodiment by using the flowchart shown in FIG. 8 while referring to FIGS. 2, 6A, 6B, 7A and 7B.

First, at step G1, the remote management computer 10 receives a report Q2 of occurrence of a problem from the working management computer 1.

At step G2, the remote management computer 10 issues a report (display and/or sound) to notify the received content to the remote manager in the remote management center.

At step G3 on, the remote manager appropriately inputs an instruction. In a certain case, it cooperates with the working manager to cope with the occurred abnormality. By the instruction, any of the operator communication function, remote operation function, information acquisition function, and the analysis function is executed.

When the instruction concerns the operator communication, at step G5, the remote manager activates the communication function. At step G6, he communicates with the working manager in the video processing system for a consultation or instructions.

When the instruction concerns the remote operation function, at step G7, the remote operation by the remote operator is executed.

When the instruction concerns the information acquisition function, at step G8, the remote management computer 10 requests various information from the working management computer 1 and at step G9 receives the various information.

When the instruction concerns the problem analysis function, at step G10, the remote management computer 10 searches through the problem cause database based on the received information and log storage and at step G11 provides a table (display) of deduced causes and countermeasures.

At step G12, the remote management computer 10 verifies whether or not the operational input by the re mote operator has been completed. When it has not been completed, it shifts the flow of the control to the series of processing of step G3 on, while when it has been completed, it terminates the processing and then enters into a waiting state.

Supplementing the explanation of the operation, the remote management center executes the operator communication function, remote operation function, information acquisition function, and the problem analysis function. Namely, the remote manager in the remote management center can deal with an occurred abnormality by cooperating with the working manager in the video processing system by appropriately repeating the operational input.

The remote management computer analyzes the problem and identifies to which of the following three types the cause of the problem corresponds:

(1) Operational error,
(2) Error of system configuration and setting, and
(3) Abnormality of apparatus.

More specifically, from the operation log information stored in the log storage database 11 and the information received at the occurrence of the problem, first it is verified whether or not there is an error in the log of the operation. Namely, it is verified whether or not there is the same information in the operation log information stored in the log storage database 11 as that stored in the database of the operational errors of the problem cause database 12. If the same information is found, it is decided that the cause is a problem due to operational error. At this time, for the operation log information stored in the log storage database 11, first, the problem cause database 12 is searched through for the newest operation information (operation information stored last). If it is not found, next, the problem cause database 12 is searched through for two operations including the one before the operation. If it is not found, this is further repeated. Finally, the above search is repeated up to a predetermined number of entries of the log data (or up to the data of the start of the log).

If the operational error is not identified by the above verification, next, the possibility of an error of the system configuration and/or setting is verified. It is verified whether or not there is the same combination in the problem cause database 12 for the configuration and/or setting of the present system. If it is found, it is decided that the cause is an error of the configuration and/or setting. Note that the "combinations" mean combinations of the types of apparatus and the setting thereof or the setting of a plurality of related (linked, connected) apparatuses.

The "setting" means selection of the signal format, a (range of) variable setting of video special effects, a combination of the panel and body, connection with peripherals (video apparatuses 4), etc.

Next, it is verified whether or not the cause is a problem of the apparatus. For apparatuses, the problem cause database 12 is searched through for the log of the setting and operation and the present state. If there is a corresponding one, it is decided that the cause is a problem of the apparatus.

When the cause of the problem cannot be identified (identification of one of three classifications) even by the above verification, it is decided that the cause is unknown (note that here, although there is a high possibility the cause is a problem of the apparatus, this cannot be judged conclusively).

The results of the decisions are provided to the remote manager in the remote management center (the decision results are displayed). When the problem cause is identified, the cause (content found in the problem cause database) is displayed.

When the remote manager decides the cause is operational error or error of the configuration and setting, he informs this to the working manager.

Preferably, the working manager etc. may refer to the content of the problem cause database 12 from the working management computer 1 for assistance in the management work. Information useful for the administration of the video processing system may be held in the remote management computer 10 as a database other than the problem causes to enable reference from the working management computer 1.

Further, the working manager in the video processing system may search through the problem cause database 12 by the information collected at the working management computer 1 and can identify the cause of the problem without the help of the remote manager.

FIGS. 9A and 9B are communication sequence diagrams showing the remote operation of the maintenance support system of the electronic apparatus according to an embodiment of the present invention.

FIG. 9A indicates the communication sequence where a usual remote operation succeeds, and FIG. 9B indicates the communication sequence where a response is not obtained from the apparatus to be remote operated.

First, in the communication sequence shown in FIG. 9A, the remote management computer 10 designates the apparatus concerned and transmits the operation command to the working management computer 1 as indicated by a symbol R1. Upon receipt of this, the working management computer 1 transmits the operation command to the apparatus concerned as indicated by a symbol R2, then sets the timer at a prescribed time. When it can acquire a return of the execution result (response) from the apparatus concerned without the time of the timer running out as indicated by a symbol R3, it returns the execution result indicated by a symbol R4 to the remote management computer 10.

Next, in the communication sequence shown in FIG. 9B, the remote management computer 10 designates the apparatus concerned and transmits an operation command to the working management computer 1 as indicated by the symbol R1. Upon receipt of this, the working management computer 1 transmits the operation command to the apparatus concerned as indicated by the symbol R2, then sets the timer at the prescribed time. When it cannot acquire a response from the apparatus concerned and the timer runs out of time, it deems that the apparatus concerned is unable to respond (does not normally operate) and returns a notification of "no response, time out" as indicated by a symbol R5, that is, the fact that the time has run out, to the remote management computer 10.

FIG. 10 is a communication sequence diagram showing the operation communication function of the maintenance support system of the electronic apparatus according to an embodiment of the present invention.

The present communication sequence is a communication sequence for a conversation between the operator in the remote management center and for example the operator in the video processing system. By the display of one input content on the other, the dialog between the two is established and operations backed up by this dialog are enabled.

First, the remote management computer 10 transmits the content of a keyboard input S1 transmitted by the remote manager in the remote management center to the working management computer 1 in the video processing system (transmission S2 of a depressed key content). Upon receipt of this, the working management computer 1 transmits the depressed key content as it is to the working manager to display it (note, the illustration of the display device performing the display is omitted) (display S3 of the depressed key content).

The working manager in the video processing system viewing the display returns a response to the working management computer 1 (keyboard input S4). Upon receipt of this, the working management computer 1 transmits the depressed key content as it is to the remote management computer 10 (transmission S5 of the depressed key content). The remote management computer 10 transmits the depressed key content as it is to the remote manager to display it (note, the illustration of the display device performing the display is omitted) (display S6 of the depressed key content).

FIG. 11 is a communication sequence diagram showing a video capture operation of the maintenance support system of the electronic apparatus in the case where a video processing apparatus is included in the electronic apparatus according to an embodiment of the present invention.

The communication sequence shown in FIG. 11 is a communication sequence in a case where a plurality of channels of video signals are connected to the video capture device 3 and a channel designated by the remote management computer 10 is captured from among them. By such a communication sequence, an intended captured image can be obtained at the remote management computer 10.

Note that preferably the remote instruction for the capture is issued from the working management computer 1 side, and provision is also made of a function of transmitting the obtained image to the remote management computer 10. The working management computer 1 is in the video processing system, so can instruct capture while viewing the video signal by the monitor, so can acquire the intended (abnormal) image as the still image. Further, a configuration wherein the time for executing the capture (time in the video processing system) can be designated to the video capture device 3 can be employed.

First, the remote management computer 10 transmits a video capture request T1 (channel designation) to the working management computer 1. Upon receipt of this, the working management computer 1 transits a video capture request T2 (channel designation) to the video capture device 3.

The video capture device 3 transmits the video image captured by a captured image T3 to the working management computer 1. Upon receipt of this, the working management computer 1 transmits a captured image T4 to the remote management computer 10.

Figure 12:
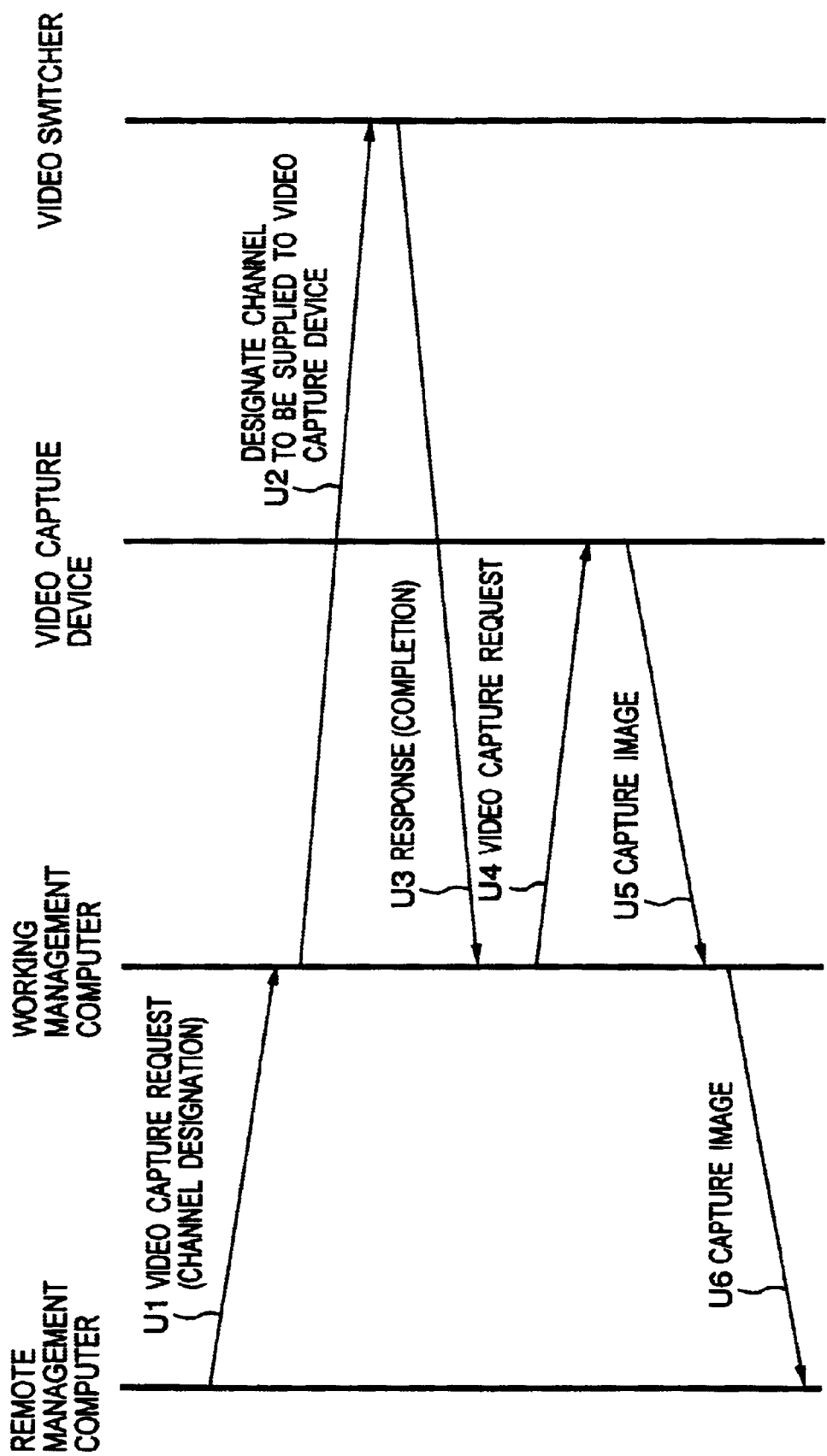
FIG. 12 is a communication sequence diagram of the video capture operation via a video switcher of the maintenance support system for the electronic apparatus in the case where a video processing apparatus is included in the electronic apparatus according to an embodiment of the present invention.

FIG. 12 is a communication sequence diagram showing a video capture operation via the video switcher of the maintenance support system of the electronic apparatus in the case where a video processing apparatus is included in the electronic apparatus according to an embodiment of the present invention.

The working management computer 1 receiving a video capture request U1 (channel designation) from the remote management computer 10 indicates the channel of the video signal to be newly supplied to the video switcher 2 supplying the video signal of the predetermined channel to the video capture device 3 (designation of channel to be supplied to the video capture device U2).

The working management computer 1, after indicating the channel to the video switcher 2, obtains a response U3 indicating that the switching of the channels was completed (completion) from the video switcher 2, then indicates a video capture request U4 to the video capture device 3 and obtains a captured image U5.

The obtained captured image is transmitted as a captured image U6 from the working management computer 1 to the remote management computer 10.

Figure 13:
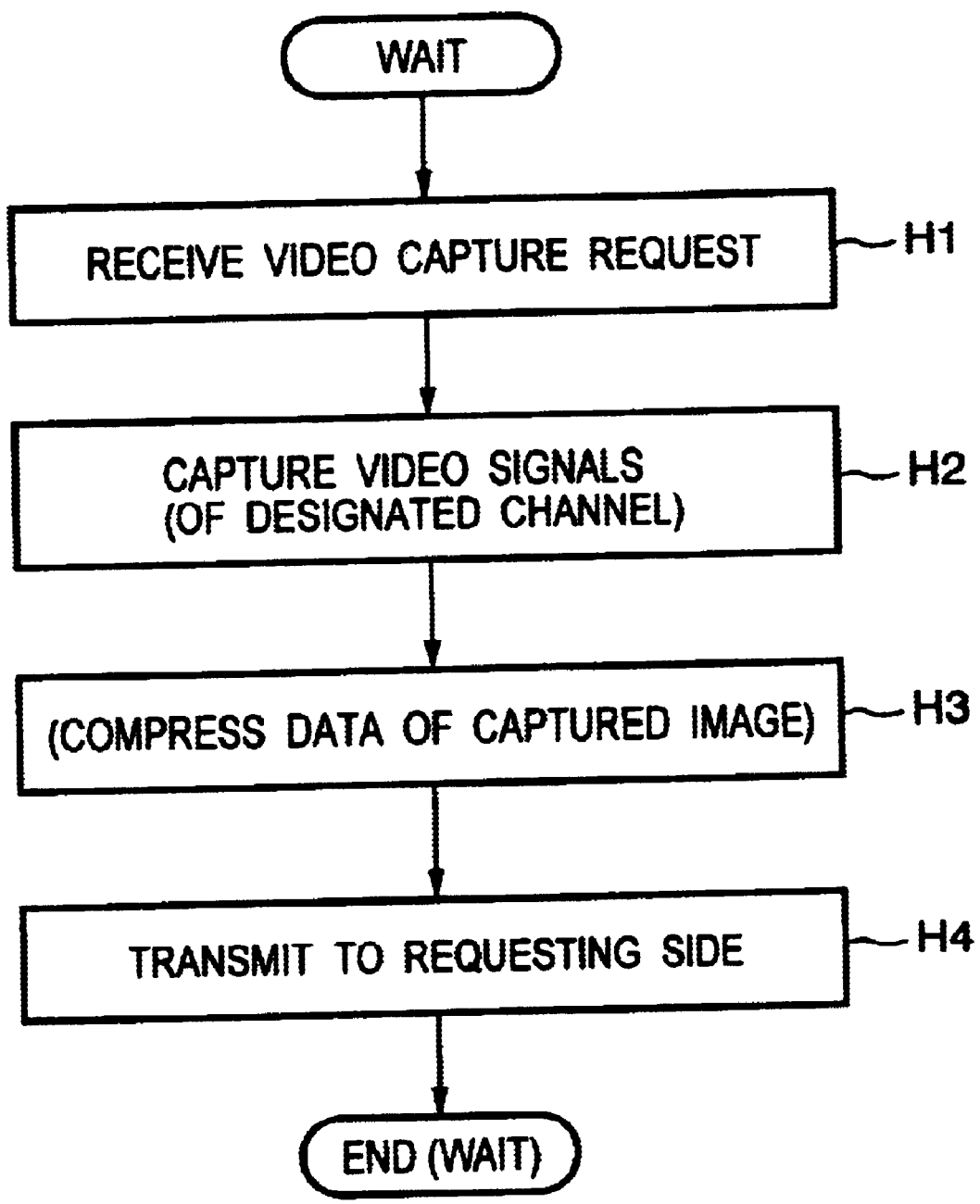
FIG. 13 is a flowchart of the video capture operation of the maintenance support system for the electronic apparatus especially to the video processing apparatus as an electronic apparatus according to an embodiment of the present invention.

FIG. 13 is a flowchart of the video capture operation of the maintenance support system of the electronic apparatus according to an embodiment of the present invention.

Below, an explanation will be given of the video capture operation of the maintenance support system of the electronic apparatus in the case where a video processing apparatus is included in the electronic apparatus according to the present embodiment by referring to FIGS. 2, 11, and 12.

First, at step H1, the working management computer 1 receives a video capture request T1 or U1 from the remote management computer 10.

At step H2, the working management computer 1 captures a video signal of the channel designated in the request (at this time, in the case of the video capture request T1, a video capture request T2 is transmitted to the video capture device 3, and in the case of the video capture request U1, the designation U2 of the channel to be supplied to the video capture device is transmitted to the video switcher 2).

At step H3, the working management computer 1 compresses the data of the captured image (note, the present step is optional).

At step H4, the working management computer 1 transmits the image data to the requesting side, that is, the remote management computer 10.

Below, the video capture operation will be further explained.

The still image captured up to the above step H2 has a relatively large data size as it is, so preferably is transmitted after compressing the data.

As the format of the still image, use can be made of various formats such as JPEG and GIF. Such formats of still images can be displayed on the used computer and can be used without regard as to the format such as the resolution of the original video signal.

Preferably, when obtaining a still image from among video signals of a plurality of formats, it is also possible to add format information (vertical and lateral resolutions, aspect ratio, color expression method, etc.) of the original video signal to the captured still image.

Preferably, the remote management computer not only displays this still image on the display device of the computer, but also reproduces it as a video signal and displays it on a video picture monitor for a video signal to enable confirmation of the color expression etc.

Figure 14:
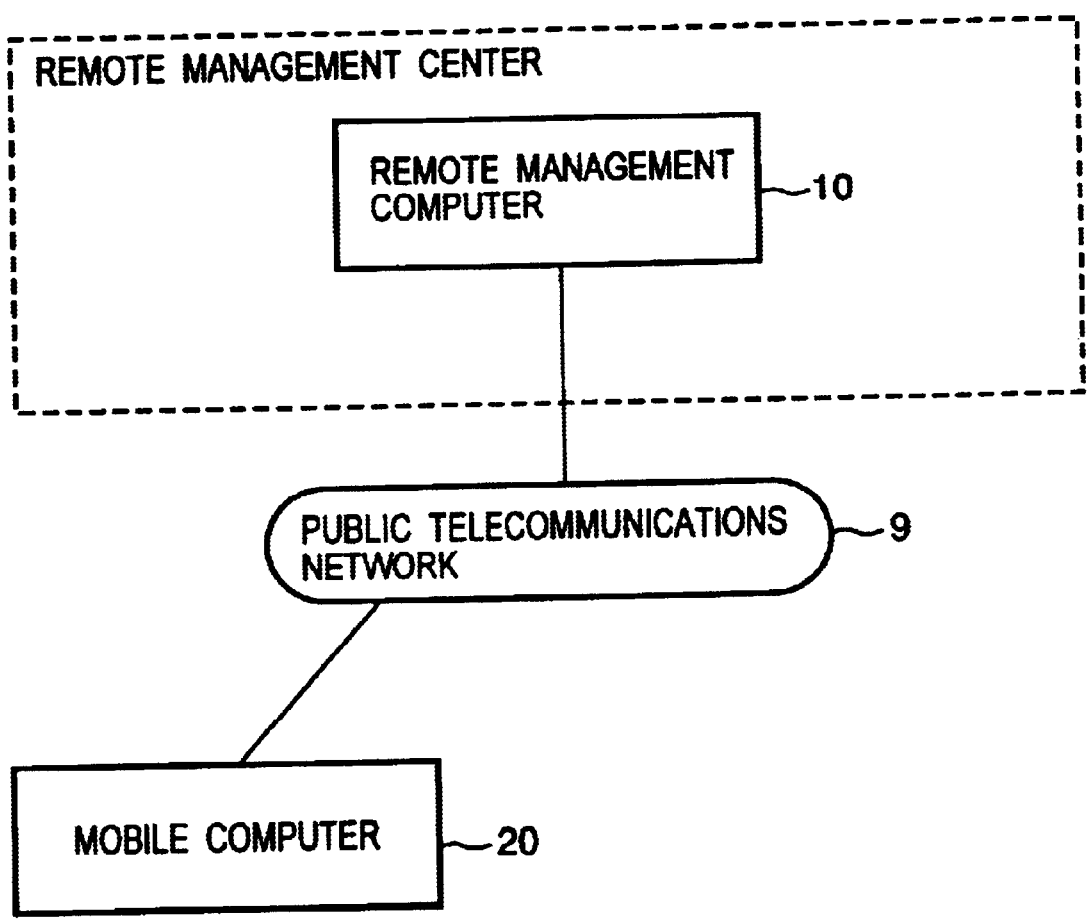
FIG. 14 is a block diagram of a communication connection of a terminal for service personnel of the maintenance support system for the electronic apparatus according to an embodiment of the present invention.

FIG. 14 is a block diagram of the communication connection of a terminal for a service personnel of the maintenance support system of the electronic apparatus according to an embodiment of the present invention.

The communication connection of the terminal for the service personnel according to the present embodiment includes a mobile computer 20 in addition to the remote management center including the remote management computer 10 and the public telecommunications network 9.

When a problem (breakdown) occurs in a video processing system, the service personnel goes to the site to restore the system. At this time, when assuming that the remote management computer 10 in the remote management center can be communicated with by only the working management computer 1, the efficiency becomes poor when a plurality of service personnel are at work. Also, the restoration work becomes difficult when the working management computer 1 itself breaks down.

For this reason, preferably, the mobile computer 20 of the service personnel is connected with the public telecommunications network 9 as shown in FIG. 14 to enable communication with the remote management computer 10 and to get the mobile computer 20 to function in the same way as the working management computer 1.

Note that, the connection of the mobile computer 20 and the public telecommunications network 9 may be achieved by a mobile telephone (wireless type telephone).

Further, it is also possible to enable connection of the mobile computer 20 with a LAN 8 in the video processing system shown in FIG. 2 and have it function in the same way as the working management computer 1 for the apparatus in the video processing system.

Figure 15:
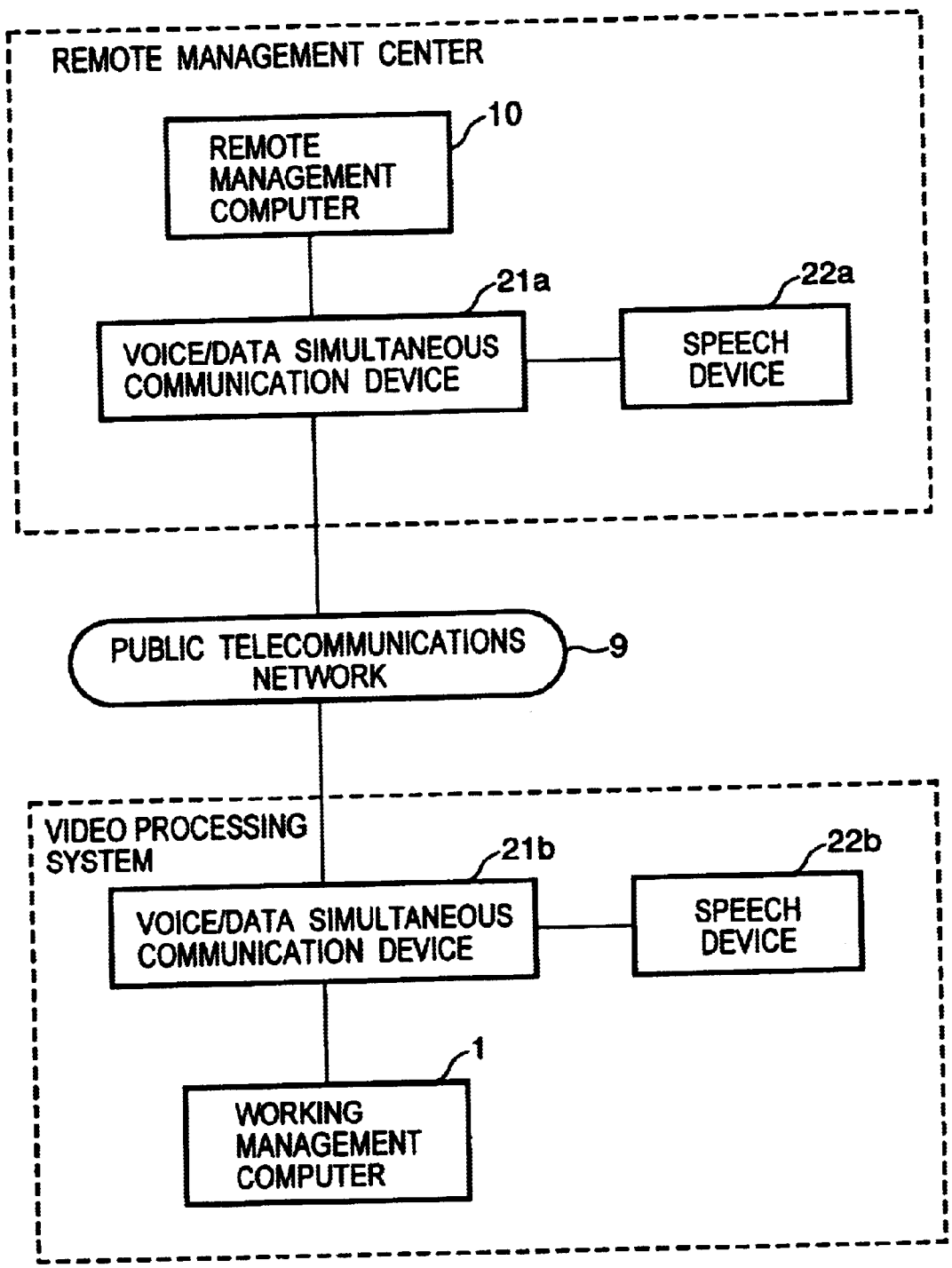
FIG. 15 is a block diagram of the configuration of a maintenance system simultaneously operating with speech by a telephone set of the maintenance support system for the electronic apparatus according to an embodiment of the present invention.

FIG. 15 is a block diagram of the configuration of a maintenance system simultaneously operating with speech by a telephone set in the maintenance support system of the electronic apparatus according to an embodiment of the present invention.

The maintenance system according to the present embodiment includes, other than the remote management computer 10, a voice/data simultaneous communication device 21a for inserting voice communication (speech) into the communication among computers, multiplexing the same according to need for communication and a speech device 22a corresponding to the telephone set in the remote management center.

Also, the electronic processing system, other than the working management computer 1, includes a voice/data simultaneous communication device 21b for inserting the voice communication (speech) into communication among computers and multiplexing the same according to need for communication and a speech device 22b corresponding to a telephone set.

Also in the standard configuration shown in FIG. 2, dialog-like communication is possible between the working manager in the video processing system and the remote manager in the remote management center, but if combined together with communication by a telephone set, the work efficiency further rises. For this purpose, use may be made of one channel in the public telecommunications network for the telephone, but if sharing the channel for data communication (for the communication between the remote management computer and the working management computer), there is merit in regard to the communication charges etc. For this purpose, the configuration as shown in FIG. 15 may be employed.

Figure 16:
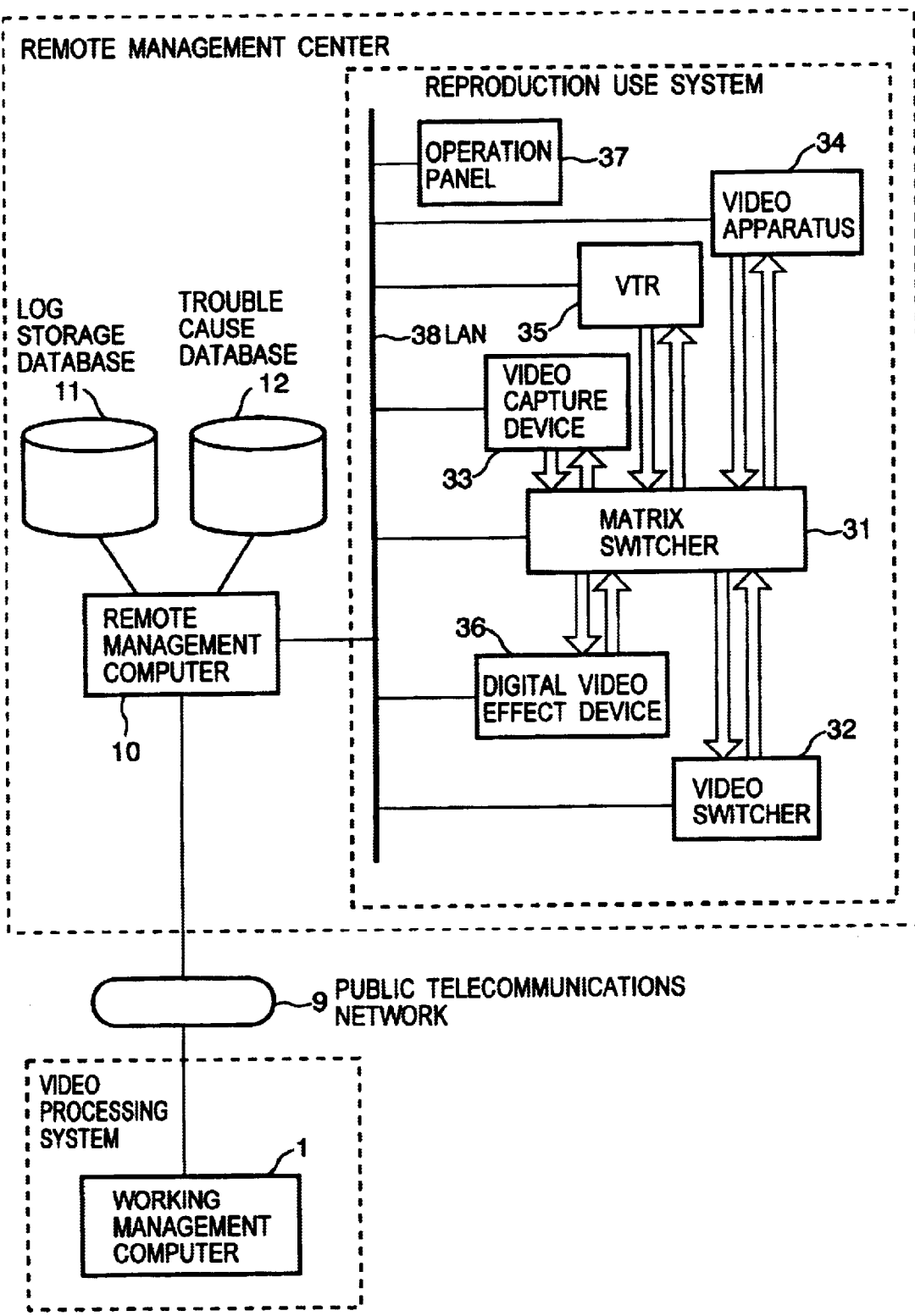
FIG. 16 is a diagram of the system configuration in the case of reproduction in the maintenance support system for the electronic apparatus in the case where a video processing apparatus is shown as an example of the electronic apparatus according to an embodiment of the present invention.

FIG. 16 is a view of the system configuration in a case where reproduction is carried out in the maintenance support system of the electronic apparatus in the case where a video processing apparatus is shown as an example of the electronic apparatus according to an embodiment of the present invention.

The system configuration in the case where the maintenance support system of the electronic apparatus according to the present embodiment performs reproduction as part of the problem analysis provides the reproduction use system in the remote management center.

The reproduction use system is comprised by having the maintenance personnel in the remote management center receiving a report of abnormality input information for defining the system to be reproduced. The connection information and the setting information concerning the object be reproduced required for the configuration are all recorded in the log storage database 11.

In FIG. 16, the detailed structure of the video processing system is similar to the configuration shown in FIG. 2, so the illustration of the detailed structure is omitted in the video processing system. Also, in the reproduction use system of the remote management center shown in FIG. 16, devices having the same names as the devices shown in FIG. 2 have the same functions as those of the devices shown in FIG. 2, so the explanation thereof will be omitted.

In the reproduction use system of the remote management center shown in FIG. 16, the device indicated by numeral 31 is a matrix switcher and switches the video signals. An input video signal may be selected from among the plurality of signals and used as the output video signal.

In the case of the reproduction use system, the remote management computer 10 achieves a similar function to that of the working management computer 1 in the video processing system.

The remote management computer 10 controls the matrix switcher 31 so that the routes of the video signals in the reproduction use system become the same as all or part of the routes of the video signals of the video processing system being reproduced.

In the video processing system being reproduced, the routes of the video signals are realized by the connection of cables etc., but in the reproduction use system, the routes of the plurality of video processing systems being remotely maintained are selected and reproduced according to need. Therefore, rather than a fixed connection by cables, route connection by the matrix switcher 31 is employed to enable realization of flexible routes.

Figure 17:
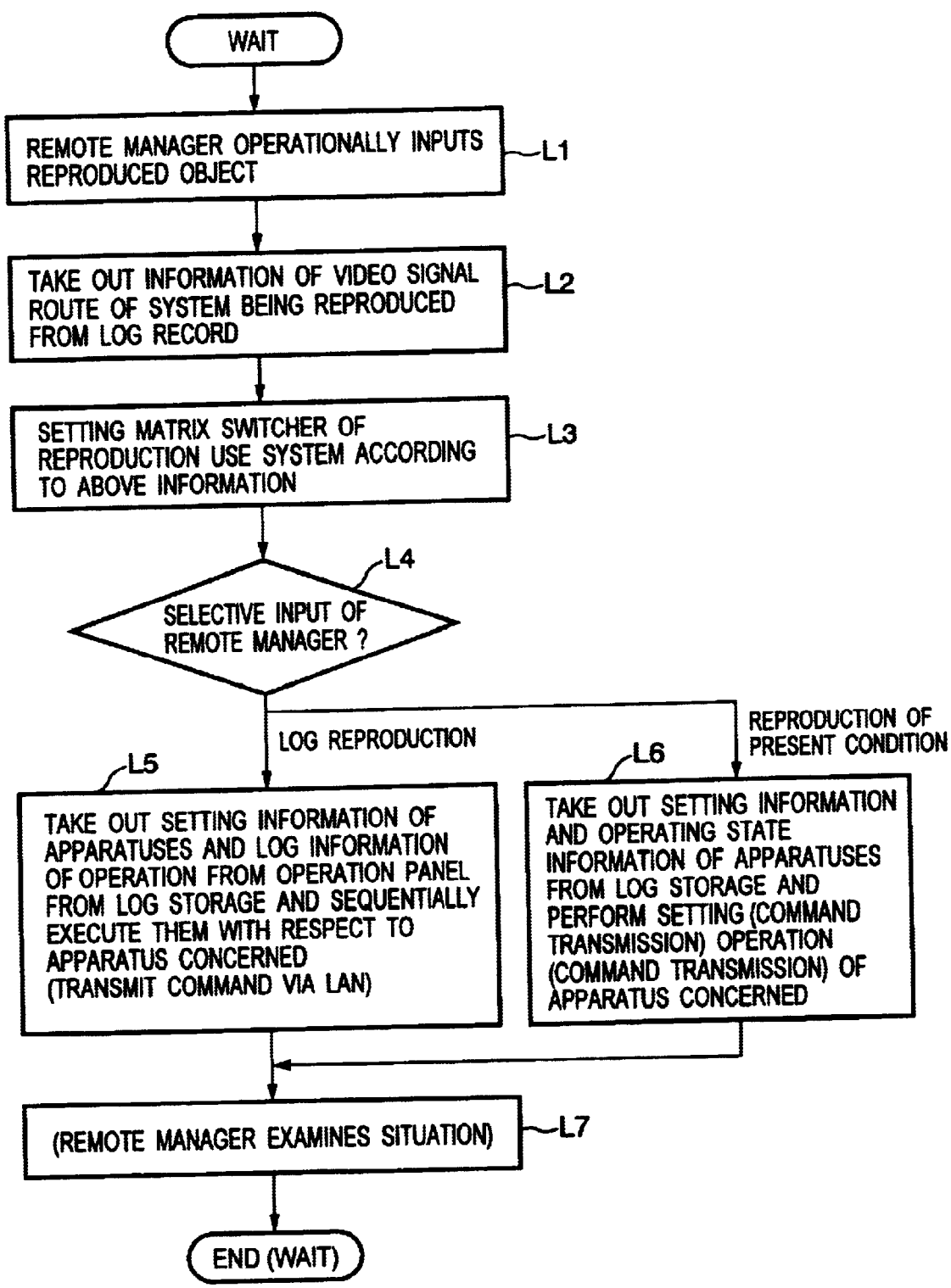
FIG. 17 is a flowchart of a control operation of the remote management computer for controlling a reproduction use system of the maintenance support system for the electronic apparatus in the case where a video processing apparatus is shown as an example of the electronic apparatus according to an embodiment of the present invention.

FIG. 17 is a flowchart of the control operation of the remote management computer for controlling the reproduction use system of the maintenance support system of the electronic apparatus in the case where a video processing apparatus is shown as an example of the electronic apparatus according to an embodiment of the present invention.

Below, an explanation will be given of the control operation of the remote management computer for controlling the reproduction use system of the maintenance support system of the video processing apparatus according to the present embodiment by using the flowchart shown in FIG. 17 while referring to FIGS. 2 and 16.

First, at step L1, information by which the remote manager in the remote management center identifies the reproduced object is operationally input.

At step L2, the information of the routes of the video signals of the system being reproduced is taken out from the log record of the log storage database 11.

At step L3, according to the information of the routes of the video signals, the matrix switcher 31 of the reproduction use system is set. Due to this, the routes of the video signals of the reproduction use system are made substantially the same as the routes of the video signals of the system being reproduced.

At step L4, the flow of the control is branched according to whether the operation manager selects log reproduction or selects present condition reproduction.

In the case of log reproduction, at step L5, the setting information of the apparatus of the system being reproduced and the log information of the operations from the operation panel 7 are taken out from the log record of the log storage database 11. The setting and the operations of the operation panel 7 are sequentially executed for the apparatus concerned of the video reproduction use system, then the operation routine shifts to the following step L7 (executed by transmitting a command from the remote management computer 10 via the LAN 38 to the apparatus concerned).

In the case of the present condition reproduction, the setting information and the operating state information of the apparatus of the system being reproduced are taken out from the log record of the log storage database 11. Due to this, the apparatus concerned of the reproduction use system is set up and the last operation (operation at occurrence of a problem) is executed after the setting (both of the setting and the last operation are made by transmitting a command from the remote management computer 10 via the LAN 38 to the apparatus concerned).

At step L7, the remote manager investigates the situation (note, the present step is optional).

Below, a supplementary explanation of the reproduction will be given.

Usually, there are a plurality of video processing systems to be remotely maintained, so the remote manager inputs which among them is to be selected as the object. The remote management computer 10 first takes out the information of the routes of the video signals of the object system (video processing system) from the log storage database 11. According to the information, the matrix switcher 31 is set up and substantially the same routes of video signals are realized among the apparatuses in the reproduction use system.

When the apparatus in the video processing system concerned is not in the reproduction use system, the portion of that apparatus is set as an alternate route (the portion going through the apparatus is simply directly connected by the matrix switcher or is substituted by another apparatus having an equivalent number of inputs and/or outputs). Next, the remote manager selects either of the log reproduction or the present condition reproduction.

In the case of log reproduction, the processing goes back to the past point in time when going back a predetermined number of times until the occurrence of the problem or the past point in time when going back a designated number of times or the setting and operations under the constant conditions (the point of time when the supply of the signal to a specific channel was started etc.). The log of the setting of the apparatus and the operations of the operation panel from that point of time to the present are sequentially executed. The information concerning the log is read from the log storage database 11.

In the case of present condition reproduction, the apparatuses in the reproduction use system are set so as to exhibit the same state as the present state of the video processing system concerned, and the last operation (operation at occurrence of a problem) is executed.

After the reproduction, in certain cases, the remote manager investigates the states of the apparatuses in the reproduction use system.

By this, the remote manager can check the cause of the problem at a remote location by using the reproduction use system and communicating with the working manager.

As mentioned above, in one embodiment of the present invention, a maintenance support system for a video processing apparatus having one or more video processing systems provided with video apparatuses and a remote management center connected to each of the video processing systems via a public telecommunications network so that two-way communication is possible, wherein each of the video processing systems is provided with a means for transmitting connection information and information concerning setting of the video apparatus and information notifying occurrence of a problem of the video apparatus to the remote management center and wherein the remote management center is provided with a means for reporting the notification of occurrence of a problem in the remote management center when receiving a notification of occurrence of a problem of a video apparatus from a video processing system, a means for receiving a notification of occurrence of a problem and configuring a reproduction use video apparatus having substantially the same connection and setting as the connection and setting of that video apparatus in the remote management center at a point of time when it receives the notification of occurrence of a problem, and a means for reproducing on the reproduction use video apparatus the state when the problem occurred by executing the same operation as the operation of the video apparatus at the point of time when it received the notification of occurrence of a problem, is provided.

Namely, one embodiment of the present invention is characterized in that a remote management computer for reproduction of phenomena for reproducing an abnormal phenomenon required for the maintenance work of a video processing system in the field and a set of reproduction use apparatuses corresponding to the apparatuses in the video processing system are provided in the remote management center.

More specifically, in addition to the remote management computer, the remote management center is provided with an apparatus for switching one or more video signals for reproduction and one or more apparatuses for processing video signals for reproduction; the group of apparatuses is connected so that control (or setting) is possible from the remote management system; and the group of apparatuses is comprised so that control (or setting) is possible based on information stored by a log storage database in the remote management center (the source of the information is the video processing system), whereby the video processing system in the field and the routes of the video signals of the group of apparatuses in the remote management center can be made substantially the same or partially the same.

Further, the video processing system in the field is provided with, in addition to the above apparatuses, a video switcher (that is, an apparatus for switching the video signals), a video capture (that is, a device for capturing the video signals), and a working management computer for the management in the field.

Due to this, it is made possible to obtain an operation record of the apparatuses in the video processing system in the field, connection information among the apparatuses, information concerning the setting and the operating state, still images etc. from the video capture, etc. even in the remote management center and thereby to improve the efficiency of remote maintenance.

For this purpose, the working management computer installed in the video processing system in the field is connected to the apparatuses in the video processing system and thereby can acquire interconnection information of the apparatuses in the video processing system, the setting (including the switched state) of the apparatuses, present operating states of the apparatuses, still images obtained by the capture means, and the operation record of the apparatus periodically or by instruction from the remote management center.

Further, the working management computer is provided with a communicating means for transmitting the periodically acquired information via a telecommunication line (public telecommunications network) to the remote management center.

Also, the working management computer is provided with a communicating means for receiving a notification of occurrence of a problem from an apparatus in the video processing system in the field and transmitting the notification via a telecommunications line to the remote management center.

Further, provision is made of a means for receiving an operation command directed to an apparatus in the video processing system in the field from the remote management computer and transferring the same to the apparatus.

Also, the working management computer provides a function for dialog between the operator (manager in the field) and the operator (remote manager) of the remote management device and thereby enables assistance in the maintenance work.

Further, the remote management center is provided with a means for displaying the received information, a means for storing and accumulating the received information, a means of receiving a notification of occurrence of a problem and reporting the same in the remote management center, and a means for transmitting an operation command directed to an apparatus in the video processing system in the field to the working management computer.

Also, the remote management center is provided with a problem cause database used for deducing the cause of occurrence of a problem from the already obtained information.

By this, the remote management center established in a remote location when seen from the video processing system in the field can not only receive a notification of occurrence of a problem as in the conventional case at the time of occurrence of a problem, but also can inform the setting and operating state etc. of the video processing system in the field to maintenance personnel in the center.

Also, at the time of occurrence of a problem, the remote management center can acquire a still image captured from the video signal from the video processing system in the field and thereby enable investigation of the phenomenon occurring in the remotely located video processing system in more detail.

Further, the remote management center periodically obtains the setting and operating state and operation log of the video processing system from the video processing system in the field and enables past log information for identifying the cause to be referred to at the time of occurrence of the problem.

Also, the remote management center can search through the problem cause database from the information obtained at the time of occurrence of a problem and quickly identify the cause of the problem and therefore enables application of suitable restorative measures or instruction of suitable restorative measures.

Further, the remote management center can have an apparatus provided for reproducing the working conditions of the video processing system in the field engage in a reproduction operation to enable a detailed investigation of the situation behind occurrence of a problem even without the maintenance personnel going to the site of occurrence of the problem at the time of occurrence of a problem.

Note that it is also possible to change the connection via the public telecommunications network 9 to connection via the Internet as an alternative means.

When transmitting information via a public telecommunications network or the Internet etc., it is possible to encrypt the information to prevent a third party from acquiring the operation log etc. of the apparatus.

Also, at the time of accessing information in the remote management center, it is also possible to restrict access by a password or the like to prevent a third party from acquiring know-how on measures to deal with abnormalities and other various information.

Further, it is also possible to include in the setting and the operating states of the apparatus information of the corresponding format during operation in the case of an apparatus capable of operating corresponding to a plurality of formats.

Also, in FIG. 2, the remote management center and the video processing system (working site) were shown in a one-to-one correspondence, but it is also possible to employ a configuration wherein a plurality of video processing systems can be connected to one remote management center for remote maintenance (support). In that case, the log is separately managed for every video processing system. Note that, the configuration information of each video processing system (information of the installed apparatuses) may be held together with the log.

Further, the topology of the LAN 8 shown in FIG. 2 may of course be any topology. It may be a format wherein the communication lines are connected from the working management computer 1 to the apparatuses as a star type too.

Further, it is also possible for the working management computer 1 to monitor the state of the LAN 8 and report when a problem occurs in the state of the LAN. When reporting a problem from each apparatus or working management computer 1, it is also possible to add the time of occurrence of the problem in the video processing system. The plurality of video processing systems usually operate with respect to one synchronization signal, therefore a common time reference is possible.

Further, the video processing system may also include an audio processing apparatus of the video signal. Also, where a problem occurs in the audio (voice), it is also possible to enable the transmission of the audio data of a designated period to the remote management computer 10. Further, it is also possible to reduce the amount of data to be transmitted by compression.

Further, even in a system processing only audio signals, the efficiency of the remote maintenance work can be raised by a configuration similar to that of the maintenance support system of the video processing apparatus according to one embodiment of the present invention.

Note that the programs for getting the computers in the system according to one embodiment of the present invention to perform processing, for example, the programs for executing the processing shown in the flowcharts of FIGS. 4A, 4B, 5A, 5B, 7A, 7B, 8, and 13, may be stored and distributed in a computer readable storage medium such as a CD-ROM or a magnetic tape. The computer, including in scope at least a microcomputer, a personal computer, and a general use computer, reads out the programs from the storage medium to execute the processing.

Further, in this embodiment of the present invention, though the explanation was given of the case that the electronic apparatus is a video processing apparatus and the electronic processing system is a video processing system, the maintenance support system for the electronic apparatus according to the present invention is applied widely to the case that the electronic apparatus is office use apparatuses including a personal computer and other apparatuses and the electronic processing system is a office processing system which needs urgent correspondence at the time of occurrence of a problem of the office use apparatuses, and to the case that the electronic apparatus is home electric products adapting to the LAN in home and the electronic processing system is the LAN system in home by such home electric products.

As explained above, in one embodiment of the present invention, a remote management center established at a remote location when viewed from a video processing system in the field is provided with means for not only receiving reports of occurrence of a problem as in the conventional case, but also for determining the setting and operating state etc. of the video processing system in the field at the time of occurrence of a problem, therefore maintenance personnel in the remote management center can take suitable measures for restoration of the system.

Also, the video processing system in the field is provided with a means for capturing an image from among the video signals to obtain a still image and transmitting the obtained still image to the remote management center to enable a more detailed check of the phenomenon occurring in a remotely located video processing system in the remote management center at the time of occurrence of the problem. Therefore, suitable restorative measures can be taken.

Further, by periodically transmitting the setting and operating states and the operation log of a video processing system to the remote management center, past log information identifying the causes can be referred to at the time of occurrence of a problem. Therefore, the suitable restorative measures can be taken at the time of occurrence of a problem.

Also, by providing a problem cause database for identifying the cause of a problem based on the information obtained at the time of occurrence of a problem, quick identification of the cause of the problem is enabled. So, it is possible to quickly take suitable restorative measures or instruct suitable restorative measures.

Further, by providing apparatuses for reproducing the working state of the video processing system in the field in the remote management center, even if the maintenance personnel does not go to the site of occurrence of a problem at the time of occurrence of a problem, detailed investigation of the situation is enabled. Therefore, suitable restorative measures can be taken.

While the invention has been described with reference to specific embodiments chosen for purpose of illustration, it should be apparent that numerous modifications could be made thereto by those skilled in the art without departing from the basic concept and scope of the invention.

What is claimed is:

1. A maintenance support system for an electronic apparatus, having one or more electronic processing systems each including an electronic apparatus, and a remote management system connected to at least one of the electronic processing systems via a public telecommunications network so that two-way communication between the remote management system and the electronic processing system is possible, wherein
    each of the electronic processing system comprises means for transmitting to the remote management system: connection information concerning a connection of the electronic apparatus, setting information concerning a setting of the electronic apparatus, and a problem notification indicating an occurrence of a problem of the electronic apparatus, and
    the remote management system comprises:
        means for reporting a problem notification when receiving a problem notification from the electronic processing system,
        means for configuring a reproduction electronic apparatus having substantially the same connection and setting as the connection and setting of the electronic apparatus at a point in time when the remote management system receives a problem notification, and
        means for reproducing on the reproduction electronic apparatus the state when the problem occurred by executing the same operation as the operation of the electronic apparatus at the point in time when the remote management system received the problem notification.

2. A maintenance support system for an electronic apparatus as set forth in claim 1, wherein each electronic processing system comprises:
    an operation log storage means for storing operations on the electronic apparatus, and
    means for transmitting the stored content of the operation log storage means to said remote management system periodically or when requested by said remote management system or when the stored content reaches a predetermined level.

3. A maintenance support system for an electronic apparatus as set forth in claim 2, wherein said remote management system comprises:
    a log storage database provided with storage areas corresponding to the electronic processing system,
    means for receiving the stored content of the operation log storage means from the electronic processing system and storing the stored content in the log storage database, and
    means for receiving a problem notification and tracing back and executing on the reproduction electronic apparatus the operations on the electronic apparatus stored in the log storage database so as to reproduce the conditions at the time of the occurrence of the problem.

4. A maintenance support system for an electronic apparatus as set forth in claim 1, wherein each electronic processing system comprises means for transmitting to the remote management system state information relating to the operating state of the electronic apparatus sampled at a predetermined period.

5. A maintenance support system for an electronic apparatus as set forth in claim 1, wherein said remote management system comprises:
    a log storage database provided with storage areas corresponding to the electronic processing system,
    means for receiving from the electronic processing system connection information, setting information, and state information relating to the operating state of the electronic apparatus sampled at predetermined periods, and storing the connection information, the setting information, and the state information in the log storage database,
    means for receiving a problem notification and configuring a reproduction electronic apparatus having substantially the same connection and setting as that electronic apparatus in the electronic processing system based on the connection information and setting information stored in the log storage database, and
    means for tracing back and executing the same operations as the operations of the electronic apparatus stored in the log storage database so as to reproduce the state at the time of occurrence of the problem on the reproduction electronic apparatus.

6. A maintenance support system for an electronic apparatus as set forth in claim 1,
    wherein said remote management system comprises;
        means for transmitting operational inputs including designation of operational apparatuses and/or speech information from an operator to the electronic processing system, and
    wherein said electronic processing system comprises means for receiving and displaying operational inputs and speech information from an operator.

7. A maintenance support system for an electronic apparatus as set forth in claim 1, wherein each electronic processing system comprises:
    means for displaying the operational input and/or speech information from the remote management system, and
    means for transmitting operational inputs and/or speech information from an operator in the electronic processing system to the remote management system.

8. A maintenance support system for an electronic apparatus as set forth in claim 1, wherein
    said electronic apparatus includes a video processing apparatus used for the processing of a video signal, and
    said electronic processing system includes a video processing system including said video processing apparatus.

9. A maintenance support system for an electronic apparatus as set forth in claim 8, wherein said video processing system comprises means for capturing a still image from a video apparatus designated by a video capture command from the remote management system, then transmitting the captured still image to the remote management system.

10. A maintenance support system for an electronic apparatus as set forth in claim 1, wherein said remote management apparatus comprises:

means for searching back through an operation log stored in a log storage database up to a predetermined time of operation for an error relating to the operation based on information received from the electronic processing system, and means for searching through a problem cause database for the possibility of error relating to the configuration and setting of the electronic processing system.

11. A maintenance support system for an electronic apparatus as set forth in claim 1, wherein said remote management system comprises means for retrieving the problem of the electronic apparatus from a problem cause database based on information received from the electronic processing system and the setting and operation log of the apparatus stored in a log storage database.

12. A maintenance support system for an electronic apparatus as set forth in claim 1, wherein the Internet is used as the public telecommunications network.

* * * * *